(12) United States Patent
Lu

(10) Patent No.: US 11,562,304 B2
(45) Date of Patent: Jan. 24, 2023

(54) PREVENTATIVE DIAGNOSIS PREDICTION AND SOLUTION DETERMINATION OF FUTURE EVENT USING INTERNET OF THINGS AND ARTIFICIAL INTELLIGENCE

(71) Applicant: Accenture Global Solutions Limited, Dublin (IE)

(72) Inventor: Mingzhu Lu, San Jose, CA (US)

(73) Assignee: Accenture Global Solutions Limited, Dublin (IE)

( * ) Notice: Subject to any disclaimer, the term of this patent is extended or adjusted under 35 U.S.C. 154(b) by 1230 days.

(21) Appl. No.: 16/035,087

(22) Filed: Jul. 13, 2018

(65) Prior Publication Data

US 2020/0019893 A1   Jan. 16, 2020

(51) Int. Cl.
  *G06Q 10/04*  (2012.01)
  *G06N 5/02*  (2006.01)
  *G06Q 30/00*  (2012.01)

(52) U.S. Cl.
  CPC ............. *G06Q 10/04* (2013.01); *G06N 5/022* (2013.01); *G06Q 30/016* (2013.01)

(58) Field of Classification Search
  CPC ...... G06Q 10/04; G06Q 30/016; G06N 5/022; G06N 3/006; G06N 5/025; G06N 20/00
  See application file for complete search history.

(56) References Cited

U.S. PATENT DOCUMENTS

| | | | |
|---|---|---|---|
| 6,049,599 | A | 4/2000 | McCausland et al. |
| 7,343,406 | B1 | 3/2008 | Buonanno et al. |
| 8,744,062 | B2 | 6/2014 | Pickford |
| 9,036,806 | B1 * | 5/2015 | Bourdaillet ............ G06Q 10/04 |
| | | | 379/265.09 |
| 9,172,809 | B1 * | 10/2015 | Mockus ............... H04M 3/5235 |
| 9,307,085 | B1 | 4/2016 | Hanson et al. |
| 9,467,567 | B1 | 10/2016 | Barkan et al. |
| 9,723,148 | B2 | 8/2017 | Conley et al. |
| 2003/0200135 | A1 | 10/2003 | Wright |
| 2007/0123472 | A1 | 5/2007 | Jung et al. |
| 2010/0332287 | A1 * | 12/2010 | Gates ..................... G06Q 30/02 |
| | | | 379/265.09 |
| 2015/0046332 | A1 | 2/2015 | Adjaoute |
| 2015/0081324 | A1 | 3/2015 | Adjaoute |
| 2015/0262067 | A1 | 9/2015 | Sridhara et al. |
| 2016/0005049 | A1 | 1/2016 | Menezes et al. |
| 2016/0352904 | A1 * | 12/2016 | Conley ................ G06Q 30/016 |

(Continued)

*Primary Examiner* — Jonathan Han

(74) *Attorney, Agent, or Firm* — Harrity & Harrity, LLP

(57) ABSTRACT

A device receives real-time data and historical data associated with a product or a service, wherein the real-time data includes data indicating real-time interactions between customers of the product or the service and customer service personnel. The device processes the real-time data and the historical data to generate processed data, and utilizes a first artificial intelligence model with the processed data to determine future events associated with the product or the service, and preventative solutions for the future events. The device extracts one or more features from the processed data to provide extracted features, and utilizes a second artificial intelligence model with the extracted features to determine priorities associated with the preventative solutions. The device performs one or more particular preventative solutions based on the priorities associated with the preventative solutions.

20 Claims, 13 Drawing Sheets

(56) References Cited

U.S. PATENT DOCUMENTS

| | | |
|---|---|---|
| 2017/0019315 A1* | 1/2017 | Tapia .................. H04L 41/0631 |
| 2017/0221072 A1 | 8/2017 | Athulurutlrumala et al. |
| 2017/0308800 A1 | 10/2017 | Cichon et al. |

\* cited by examiner

PREVENTATIVE DIAGNOSIS PREDICTION AND SOLUTION DETERMINATION OF FUTURE EVENT USING INTERNET OF THINGS AND ARTIFICIAL INTELLIGENCE

BACKGROUND

Usually, operational or service centers (e.g., applicant service centers, call centers, and/or the like) in industries (e.g., utility industries) receive a large volume of applicant service requests from several different interactions on channels (e.g., email messages, mail, telephone calls, and/or the like) globally in different time zones. Traditionally, service centers require many agents or human labor to interact with applicants' requests, where applicant service requests include inquiries and requirements with respect to various issues from applicants, such as bills, equipment damages, service outages, service provisions, and/or the like. Typical systems provide future predictions of phone calls received in a call center or email requests or other channels requests, and rely on probability prediction based on historical interactions. Existing systems rely upon probability prediction based on historical interactions.

SUMMARY

According to some implementations, a device may receive real-time information and historical information associated with services, products, inventories, system procedures, and/or the like, wherein the real-time information may include information indicating real-time interactions between customers of a product or a service and customer service personnel. The device may process the real-time information and historical information to generate processed information, and may apply artificial intelligence, machine learning, information retrieval, natural language processing techniques, and/or the like with the processed information to determine a preventive diagnosis, a future event, a solution, and preventative solutions of future events. The device may extract one or more features from the processed information to provide extracted features, and may utilize artificial intelligence, data mining, hidden knowledge discovery, inference reasoning, and/or the like based on the extracted features to generate preventative solutions, determine priorities, and calibrate the priorities.

According to some implementations, a method may include receiving real-time data and historical data associated with a product or a service, wherein the real-time data may include data indicating real-time interactions between customers of the product or the service and customer service personnel. The method may include processing the real-time data and the historical data to generate processed data, and utilizing a first artificial intelligence model with the processed data to determine future events associated with the product or the service, and preventative solutions for the future events. The method may include extracting one or more features from the processed data to provide extracted features, and utilizing a second artificial intelligence model with the extracted features to determine priorities associated with the preventative solutions. The method may include extracting entity information from the processed data, and generating a virtual assistant based on the entity information. The method may include performing one or more preventative solutions based on the priorities associated with the preventative solutions and via the virtual assistant.

According to some implementations, a non-transitory computer-readable medium may store instructions that include one or more instructions that, when executed by one or more processors of a device, cause the one or more processors to receive real-time data and historical data associated with a product or a service, wherein the real-time data may include data indicating real-time interactions between customers of the product or the service and customer service personnel, and the historical data may include data indicating historical interactions between the customers and the customer service personnel. The one or more instructions may cause the one or more processors to utilize a first artificial intelligence model with the real-time data and the historical data to determine future events associated with the product or the service, and preventative solutions for the future events. The one or more instructions may cause the one or more processors to extract one or more features from the real-time data and the historical data to provide extracted features, and utilize a second artificial intelligence model with the extracted features to determine priorities associated with the preventative solutions. The one or more instructions may cause the one or more processors to extract entity information from the real-time data and the historical data, and utilize a third artificial intelligence model with the entity information to generate a virtual assistant. The one or more instructions may cause the one or more processors to perform one or more particular preventative solutions based on the priorities associated with the preventative solutions and via the virtual assistant.

DETAILED DESCRIPTION

Figure 1A:
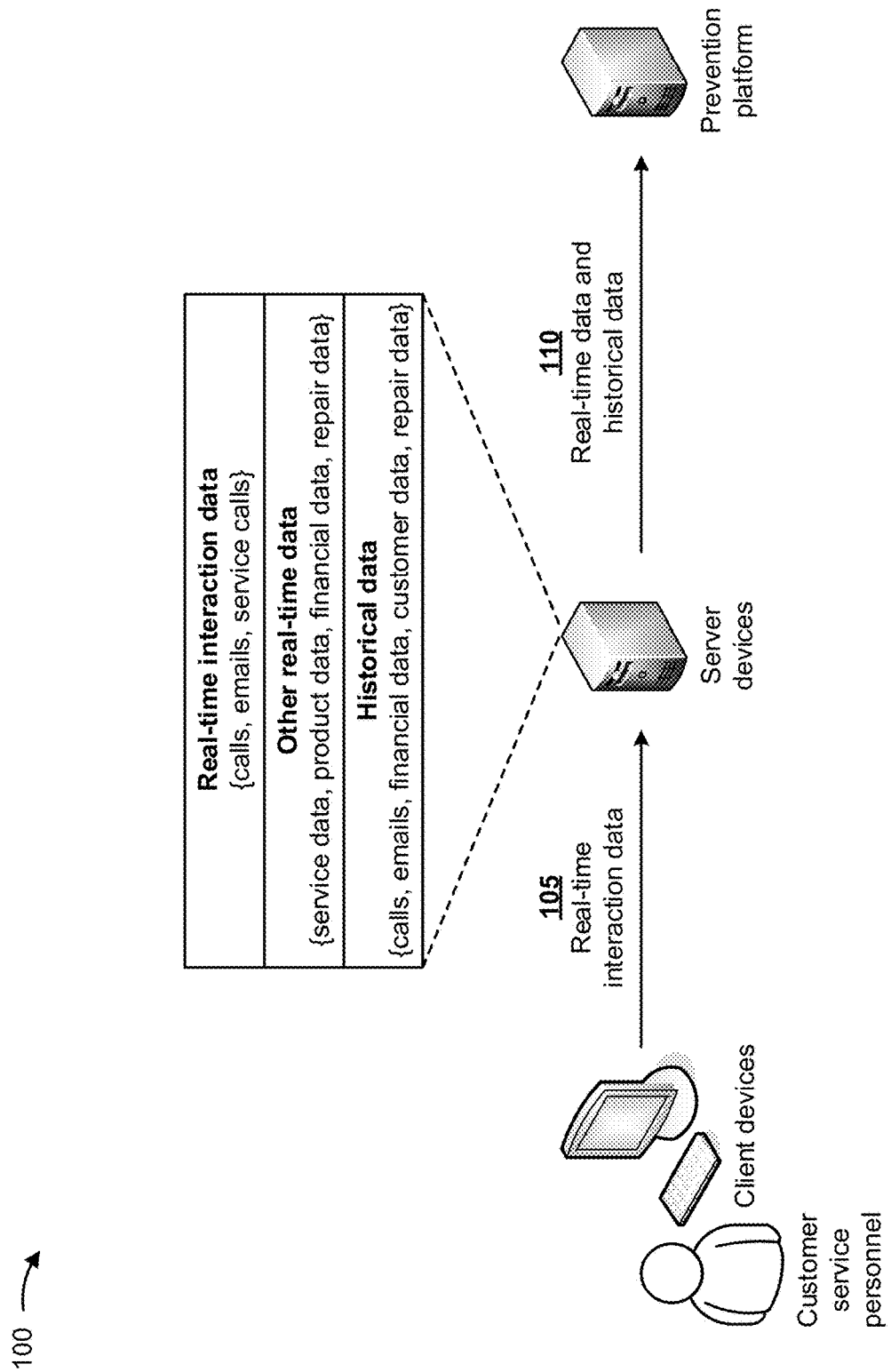
FIGS. 1A-1J are diagrams of an example implementation described herein.

The following detailed description of example implementations refers to the accompanying drawings. The same reference numbers in different drawings may identify the same or similar elements.

Theoretically and practically, using any human agents in operational or service centers to process applicant service requests is expensive, inefficient, and error-intensive. Effectively managing a large quantity of human agents in service centers is a daunting challenge. There are existing systems which predict future applicant service requests (e.g., future call volume per hour or per day, future call length, and/or the like) so human agents may be better allocated in service centers. However, such systems merely use historical information, real time information, and live streaming information to predict future applicant service requests, do not reduce quantity of applicant service requests, and do not reduce quantity of human agents, which are very expensive, human labor intensive, and tedious. Preventative diagnosis and solution determination platforms include wide applications in commercial sectors, consumer sectors, healthcare sectors, education sectors, government sectors, and/or the like, and may be used with operational management with respect to processes and complex knowledge, such as policies, operations, and negotiations.

Some implementations described herein may provide a preventative diagnosis and solutions determination platform which provides an efficient, preventive, and resource optimization mechanism to manage various of preventative diagnosis predictions and determines solutions to future events through leveraging Internet of Things (IoT) and artificial intelligence technologies. The preventative diagnosis and solution determination platform includes functions of various operational tasks, resource management, and services centers, which is convenient to implement, economical and/or inexpensive, while maintaining accuracy and reliability.

The preventative diagnosis and solution determination platform includes functions of preventative diagnosis and preventative solutions determinations of future events through IoT and artificial intelligence techniques. A platform on computational clouds (such as Amazon AWS, Microsoft Azure, Google Cloud, etc.) receives real-time information, historical information, and/or related information associated with a product, a service, or related procedures, and processes the information to generate processed information. Based on the processed information, the platform may generate or extract features, and may utilize artificial intelligence (e.g., machine learning, data mining, and/or the like) and IoT to determine a future event (when, where, who, what, why, how), a real preventative solution, an effective service, and actual solutions with dynamic priorities. Furthermore, the preventative diagnosis and solution determination platform may use an artificial intelligence model with extracted entity information of the processed information to generate an intelligent dialog and service platform, and may perform a preventative solution based on priorities and via the intelligent dialog and service platform. The preventative diagnosis and solution determination platform may cause a solution to be performed to resolve a future event associated with the preventative solution, may monitor the solution of future event, and may generate a visualization in different formats with respect to the solution.

In some implementations, a virtual platform or virtual concierge assistant, associated with the preventative diagnosis and solution determination platform, may be assigned to each applicant to continuously evaluate potential needs from applicants and proactively initiate services (e.g., and proactively contact applicants if needed) prior to contact initiated by applicants. For example, prior to receiving out of bound channel requests from applications, the virtual platform may prioritize services and solutions to resolve the out of bound channels through comprehensive inference from features, such as likelihood, diagnosed reasons, value (or retention) risk, applicant value, applicant loyalty, service difficulty scores, and/or the like. The preventative diagnosis and solution determination platform may address a variety of requests, via a variety of channels, such as phone calls, e-mail requests, mailed documents, and/or the like, and may address various issues, such as lags, conflicts, inconsistency, and/or the like, from different channels.

FIGS. 1A-1J are diagrams of an example implementation 100 described herein. As shown in FIG. 1A, customer service personal, of an applicant service department, may be associated with client devices, server devices, and a preventative diagnosis and solution determination platform (e.g., hereinafter to referred to as prevention platform). The applicant service department can be associated with a service center for an entity (e.g., a company, a government agency, an academic institution, and/or the like) that provides products and/or services to applicants. That applicant service department may use client devices to interact with applicants via a variety of communication channels (e.g., emails, telephone calls, text messaging, an entity website, and/or the like). When the applicant service department interacts with applicants in real time, the client devices may generate real time interaction data or live streaming data associated with the interactions between the applicant service department and the applicants.

As further shown in FIG. 1A, and by reference number 105, the client devices may provide, to the server devices (e.g., associated with the entity), the real-time interaction data or information, and the server devices may receive and store the real-time interaction data. In some implementations, the real-time interaction data may include live streaming information, information associated with calls between the applicant service department and applicants, emails between the applicant service department and applicants, service calls for applicants, website sessions between the applicant service department and applicants, and/or the like.

As further shown in FIG. 1A, the server devices may store other real-time data or information, monitoring information, and/or live streaming information associated with the entity, such as service information (e.g., information indicating services provided by the entity, information providing details of services, information indicating current issues or events associated with services, such as service outages or service prices increases, and/or the like), product information (e.g., information indicating products provided by the entity, information providing details of products, information indicating current events associated with products, such as product recalls or product price increases or incorrect charges, and/or the like), financial information (e.g., information associated with balance sheets, service prices, product prices, costs, and/or the like of the entity), repair information (e.g., information associated with repairs being provided by the entity to applicants or within entity), and/or the like.

As further shown in FIG. 1A, the server devices may store historical data or information associated with the entity, such as historical interaction (e.g., historical information associated with calls, emails, service calls, website interactions, and/or the like), other historical information (e.g., historical service information, historical product information, historical financial information, historical repair information, historical information associated with equipment which provides products and/or services, and/or the like), and/or the like. In some implementations, the server devices may receive real time monitoring information and/or live streaming information, and may store such information with timestamps and/or other retrieval or indexing information. In some implementations, the real-time interaction information, the other monitoring information, and the historical information may each include thousands, millions, billions, and/or the like of records, which may be referred to as massive information, big information, and/or large-scale information.

As further shown in FIG. 1A, and by reference number 110, the server devices may provide real-time information (e.g., the real-time interaction information and the other real-time information) and the historical information to the prevention platform. The prevention platform may receive the real-time information and the historical information, and may store the real-time information and the historical information. In some implementations, the prevention platform may securely store the real-time information and the historical information, as described elsewhere herein. In some implementations, the prevention platform may continuously receive the real-time information from the server devices, may periodically receive the real-time information from the server devices, may receive the historical information separately from the real-time information, and/or the like, as described elsewhere herein.

Figure 1B:
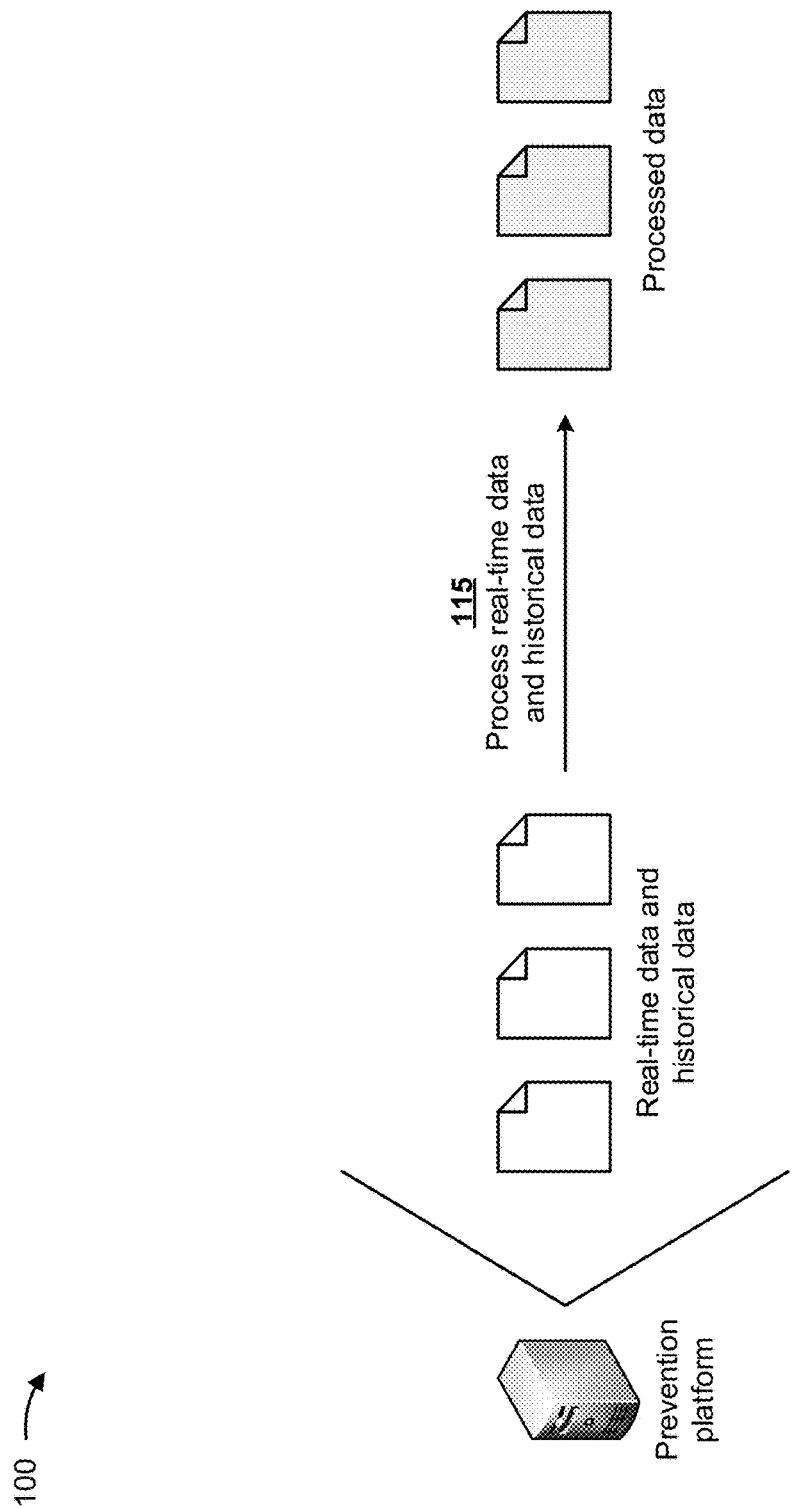

As shown in FIG. 1B, and by reference number 115, the prevention platform may process the real-time information, the historical information, and/or other related information (e.g., information obtained from a crawl of the Internet, from a scan of internal or external documents, from a scan of domain experts knowledge, and/or the like) to generate processed data or transformed data in different formats, domains, and/or feature spaces. In some implementations, the prevention platform may use one or more processing techniques on the real-time information, the live streaming information, the historical information, and any related information, to convert such information into electronic or machine-encoded information (e.g., processed information). For example, the prevention platform may utilize optical character recognition, speech recognition, a natural language processing technique, a computational linguistics technique, a text analysis technique, a data normalization method, a data cleansing method, and/or the like, to process the real-time information, the live streaming information, the historical information, and the other related information, to generate the processed information, as described elsewhere herein.

Figure 1C:
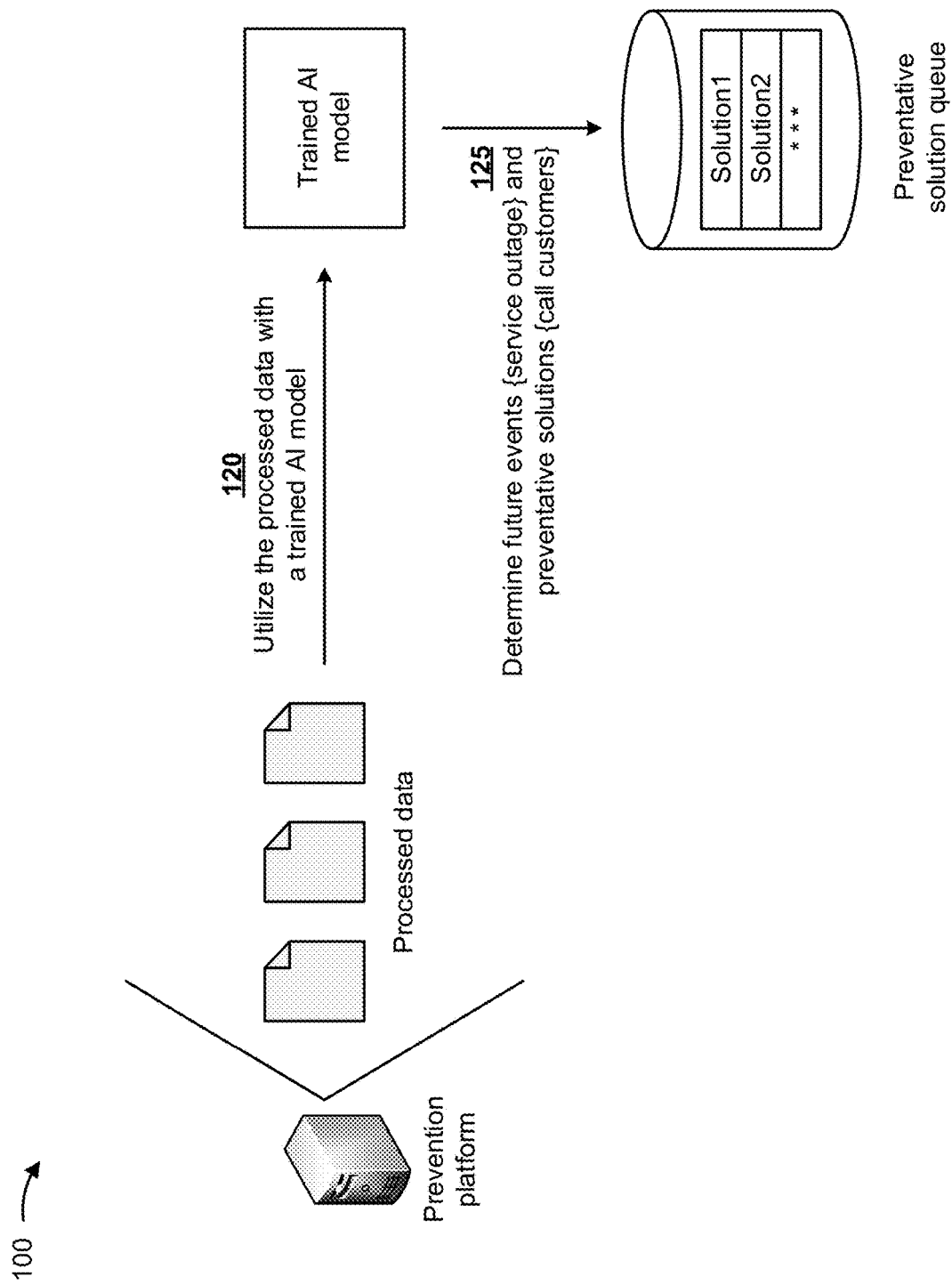

As shown in FIG. 1C, and by reference number 120, the solution prevention platform may use the processed information with a trained model or artificial intelligence models or ensemble model methodologies. In some implementations, the artificial intelligence model may include one or more of a lasso regression model, a random forest model, a support vector machine model, an artificial neural network model, a data mining model, a frequent rule mining model, a pattern discovery model, and/or the like, as described elsewhere herein.

In some implementations, the prevention platform may provide information processing, feature generation, feature selection, model training, model testing and validation, deployment of models, and/or the like, in order to generate preventative diagnosis predictions and solutions, determinations of future events, and/or the like. For example, the prevention platform may train or generate an artificial intelligence model based upon real time information, live streaming information, monitoring information, and historical information (e.g., training information) to predict future events or operational request volume and/or time windows, to diagnose potential service failures reasons ahead of time, and to determine preventative solutions to avoid the service failures ahead of time. Based on outcomes, prevention platform may continuously update the trained model, artificial intelligence model, and information simultaneously by incremental learning, reinforcement learning, and online learning. In some implementations, the prevention platform may periodically update the artificial intelligence model. The prevention platform may repeat this procedure until correct predictions are generated by the artificial intelligence model and methodologies.

As further shown in FIG. 1C, and by reference number 125, utilizing the processed information with the trained artificial intelligence model may cause the trained artificial intelligence model to predict future events (e.g., a service outage, an issuance of a bill, an incorrect charge, a refund, and/or the like) and preventative solutions or solutions (e.g., calling applicants about servicing equipment to prevent a service outage, dispatching service technicians to replace equipment, and/or the like) to address future events. As further shown in FIG. 1C, the prevention platform may store information associated with the preventative solutions in a preventative solution queue, or look-up table, associated with the prevention platform. In some implementations, the prevention platform may store the information associated with preventative solutions as an IF-THEN rules-based system. For example, the prevention platform may store information associated with a first preventative solution (e.g., solutionSolution1), a second preventative solution (e.g., solutionSolution2), and/or the like in the preventative solution queue. In some implementations, the preventative solution queue may be used for indexing purposes, which may include a dynamic storage format, an indexing storage format, and/or the like, to store inferred hidden knowledge and to manage ambiguous and fuzzy situations (e.g., referred to as dynamic solutions indexing storage).

A preventative dynamic solution indexing storage may include a searchable database or an index-oriented database, which does not include fixed key-value pairs. The preventative dynamic solutions indexing storage may provide proactive solutions to prevent operational requests and/or service events (e.g., service outages, service facilities failures, bill payments, and/or the like). The triggers of events are different, where preventative order could be ranked differently solution in various scenarios or situations, and could have ambiguity values or membership functions to each of preventative to procedure ambiguous and fuzzy real industrial applications.

Figure 1D:
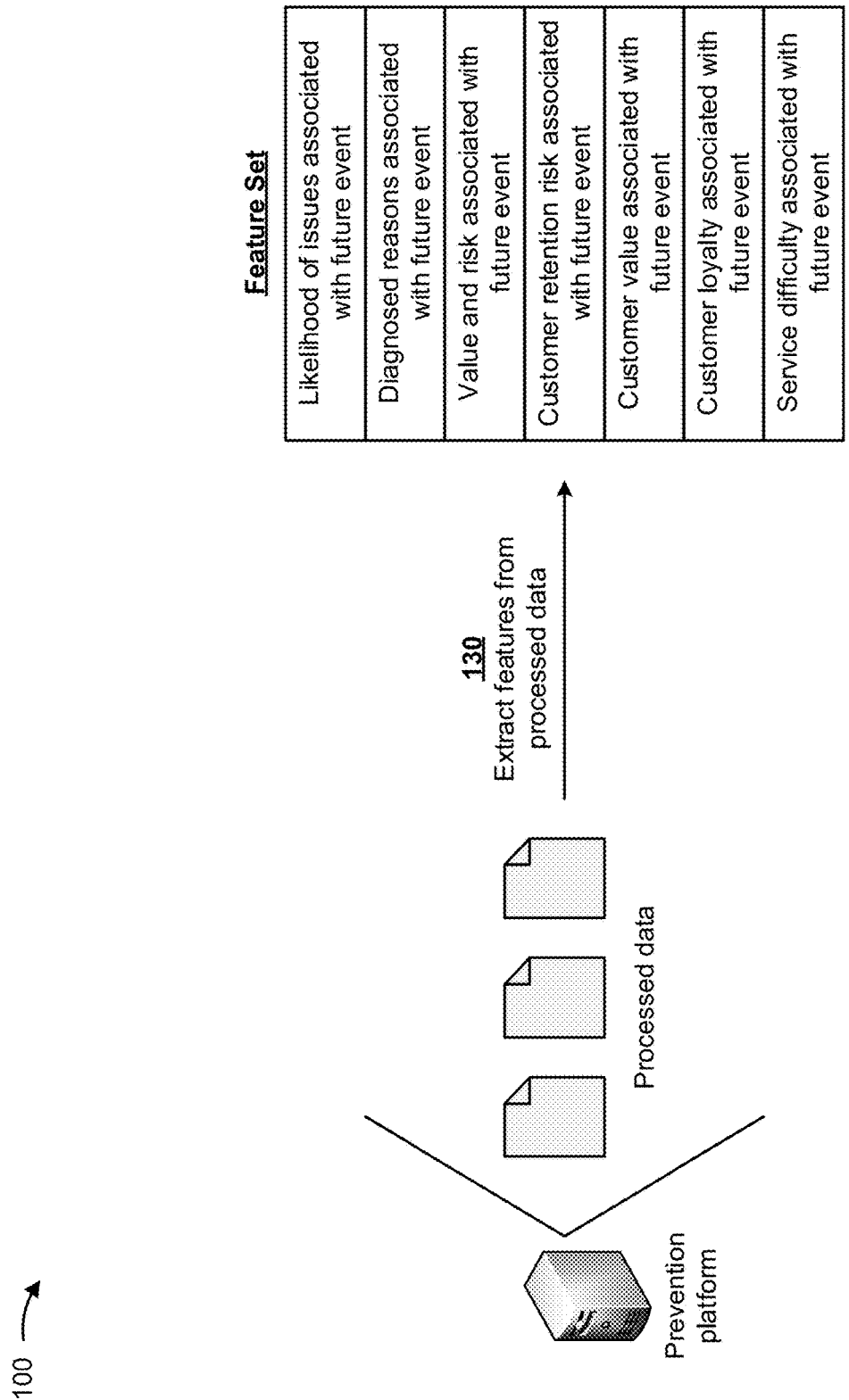

As shown in FIG. 1D, and by reference number 130, the prevention platform may extract features from the processed information. In some implementations, the extracted features may form a feature set which includes, for example, a feature indicating a likelihood of issues with a future event, a feature indicating diagnosed reasons associated with a future event, a feature indicating a value at risk (e.g., to an entity) associated with a future event, a feature indicating an applicant retention risk associated with a future event, a feature indicating an applicant value associated with a future event, a feature indicating applicant loyalty associated with a future event, a feature indicating a service difficulty associated with a future event, and/or the like.

In some implementations, the prevention platform may utilize a variety of data extraction methodologies to extract the features from the processed information or raw information, such as extracting information into flat files using a structured query language (SQL), extracting information into flat files using a program, exporting information into export files, logical extraction or rule mining methodologies (e.g., a full extraction method, an incremental extraction method, and/or the like), physical extraction methodologies (e.g., an online extraction method, an offline extraction method, and/or the like), an entity extraction method (e.g., also called an entity identification method, an entity chunking method, or a named-entity recognition (NER) method), a string matching method, and/or the like, as described elsewhere herein.

Figure 1E:
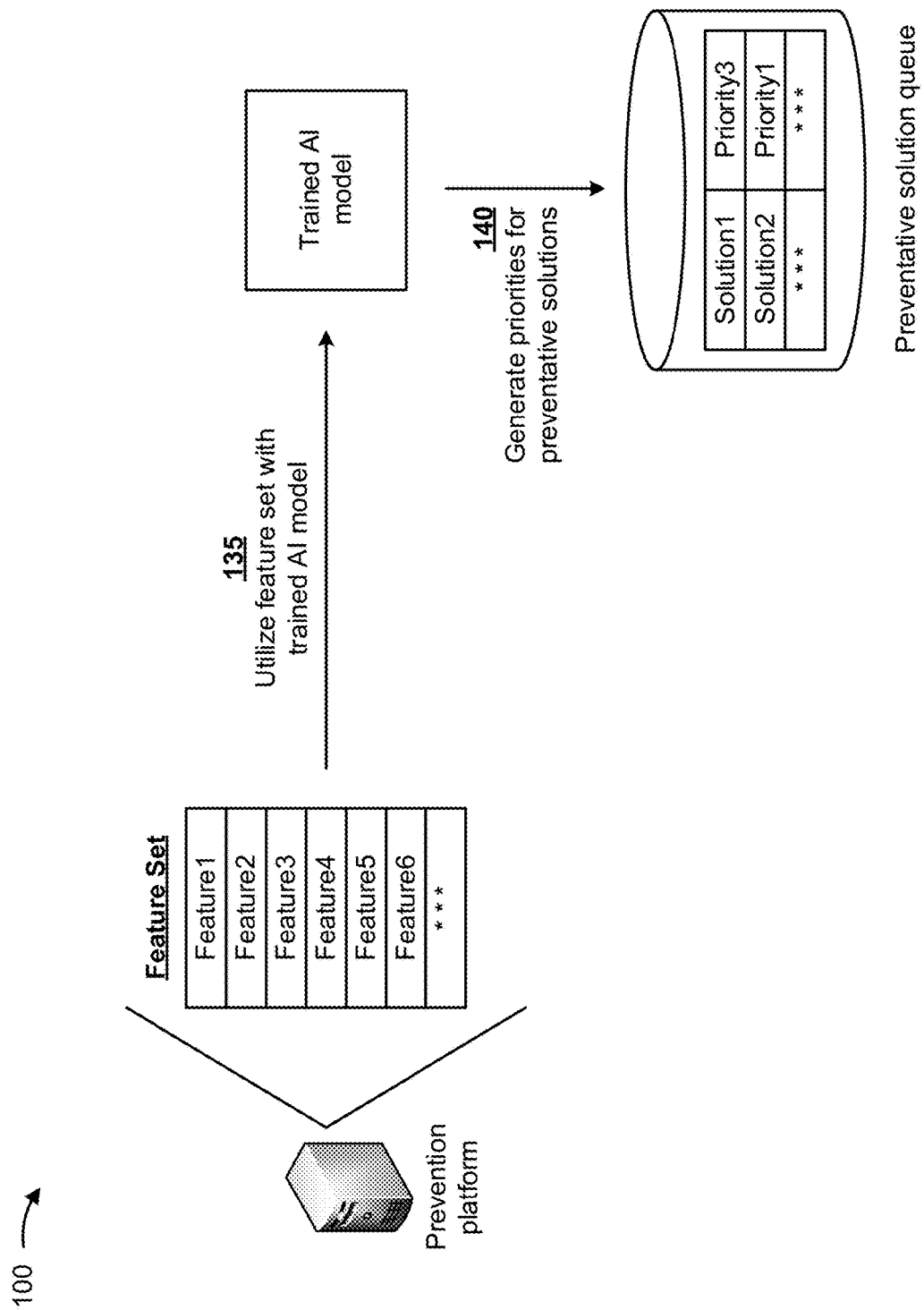

As shown in FIG. 1E, and by reference number 135, the prevention platform may utilize the extracted features (e.g., the feature set) with a trained artificial intelligence model. In some implementations, the artificial intelligence model may include one or more of a lasso regression model, a random forest model, a support vector machine model, an artificial neural network model, a data mining model, a frequent rule mining model, a pattern discovery model, and/or the like, as described elsewhere herein. In some implementations, the prevention platform may train the artificial intelligence model as described elsewhere herein.

As further shown in FIG. 1E, and by reference number 140, utilizing the feature set with the trained models and AI models take generated feature sets as input and rank priorities for preventative solutions stored in preventative dynamic indexing storage. In some implementations, it involves monitoring, such as sensor readings of watch pipeline equipment, cameras of power usages, and facilities safety video cameras, where ambiguous and fuzzy mathematics or techniques are broadly applicable and works more flexible than traditional Artificial Intelligence techniques. From system point of view, the prevention platform may include preventive dynamic approaches to control and balance dynamic systems to avoid chaos or broken systems, where system could be an operational system, a service system, and a bad or failure events prevention system. The prevention platform may provide reminders and warnings of facilities, systems, equipment, and/or the like to be replaced or shut down, due to different diagnosed preventive codes, which includes damaged facilities, incapable or broken systems, inaccurate equipment (IoT sensor's inaccurate reading), and/or the like.

Moreover, as shown in FIG. 1E, the prevention platform stores and retrieves solution information with priorities and preventative solutions from preventative dynamic solutions indexing storage. The prevention platform stores solutions information and generates preventative solutions and their priorities dynamically. Solutions and order of solutions may be changed based on trained models or models simultaneously and dynamically. In implementations, priorities provide an indication of when preventative solutions are to occur, with more urgent or important preventative solutions having higher priorities than less urgent or important preventative solutions. For instance, after a certain time, Priority3 within preventative dynamic solutions indexing storage may be associated with first preventative solution, Priority 1 may be associated with second preventative solution, and/or the like.

Figure 1F:
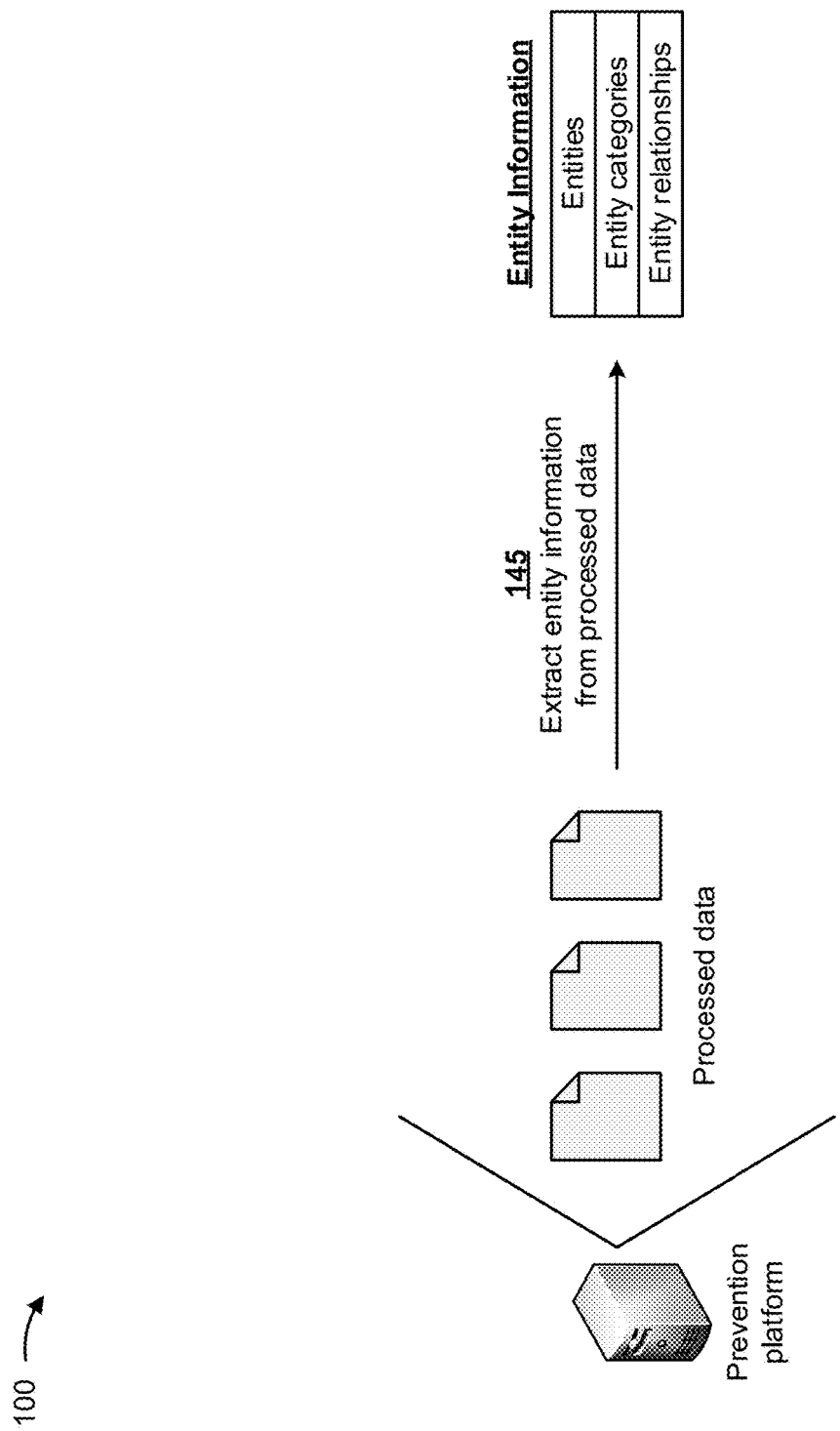

As shown in FIG. 1F, and by reference number 145, the prevention platform may extract entity information from the processed information. In some implementations, the prevention platform may use a variety of information extraction methodologies to extract the entity information from the processed information, such as extracting information into flat files using SQL, extracting information into flat files using a program, exporting information into export files, a full extraction method, an incremental extraction method, an online extraction method, an offline extraction method, an entity extraction method, a string matching method, a shallow parsing method, a deep parsing method, and/or the like, as described elsewhere herein. As further shown in FIG. 1F, the entity information may include information identifying entities, entity categories, entity relationships, and/or the like.

Figure 1G:
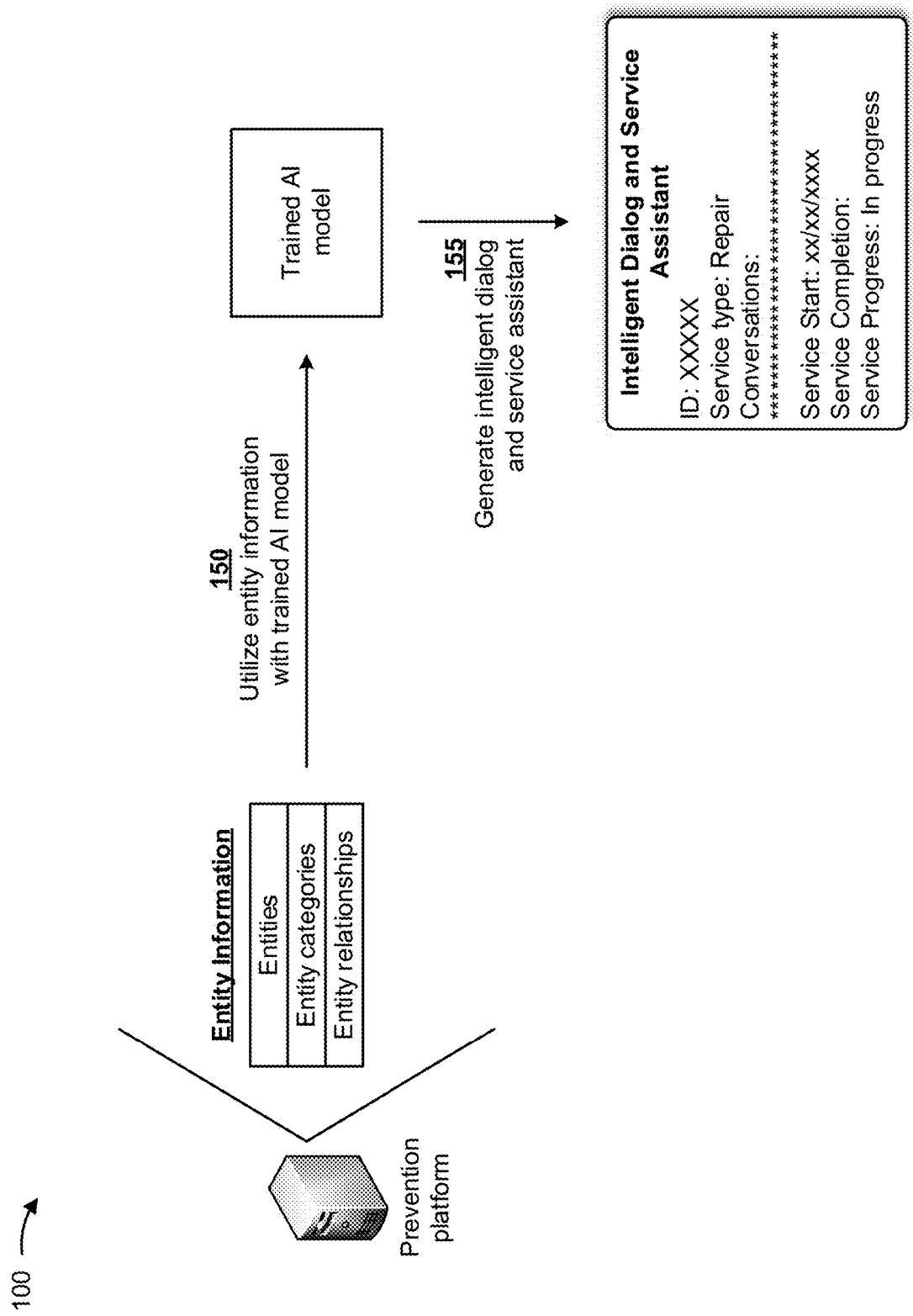

In FIG. 1G, with reference number 150, the prevention platform contains trained models and trained artificial intelligence model to use entity information, which includes entity names, entity categories, and entity relationships. In some implementations, the artificial intelligence model may include one or more of a lasso regression model, a random forest model, a support vector machine model, an artificial neural network model, a data mining model, a frequent rule mining model, a pattern discovery model, and/or the like, as described elsewhere herein. In some implementations, the prevention platform may train the artificial intelligence model as described elsewhere herein.

As further shown in FIG. 1G, and by reference number 155, utilizing the entity information with the trained artificial intelligence model may cause the trained artificial intelligence model to generate an intelligent dialog and service assistant or platform. In some implementations, the intelligent dialog and service assistant may include a virtual assistant or platform (e.g., a virtual concierge) which is assigned to a client or a group of clients for conducting preventive diagnosis prediction and/or proactive preventative solutions determination. For example, as further shown in FIG. 1G, the intelligent dialog and service assistant may provide, to a client or a group of clients, information associated with a particular preventive solution, such as a service identifier (ID), information associated with a service type (e.g., repair facilities damages), information associated with conversations with a particular client, information associated with a service start date, a service completion data, service progress, and/or the like.

Figure 1H:
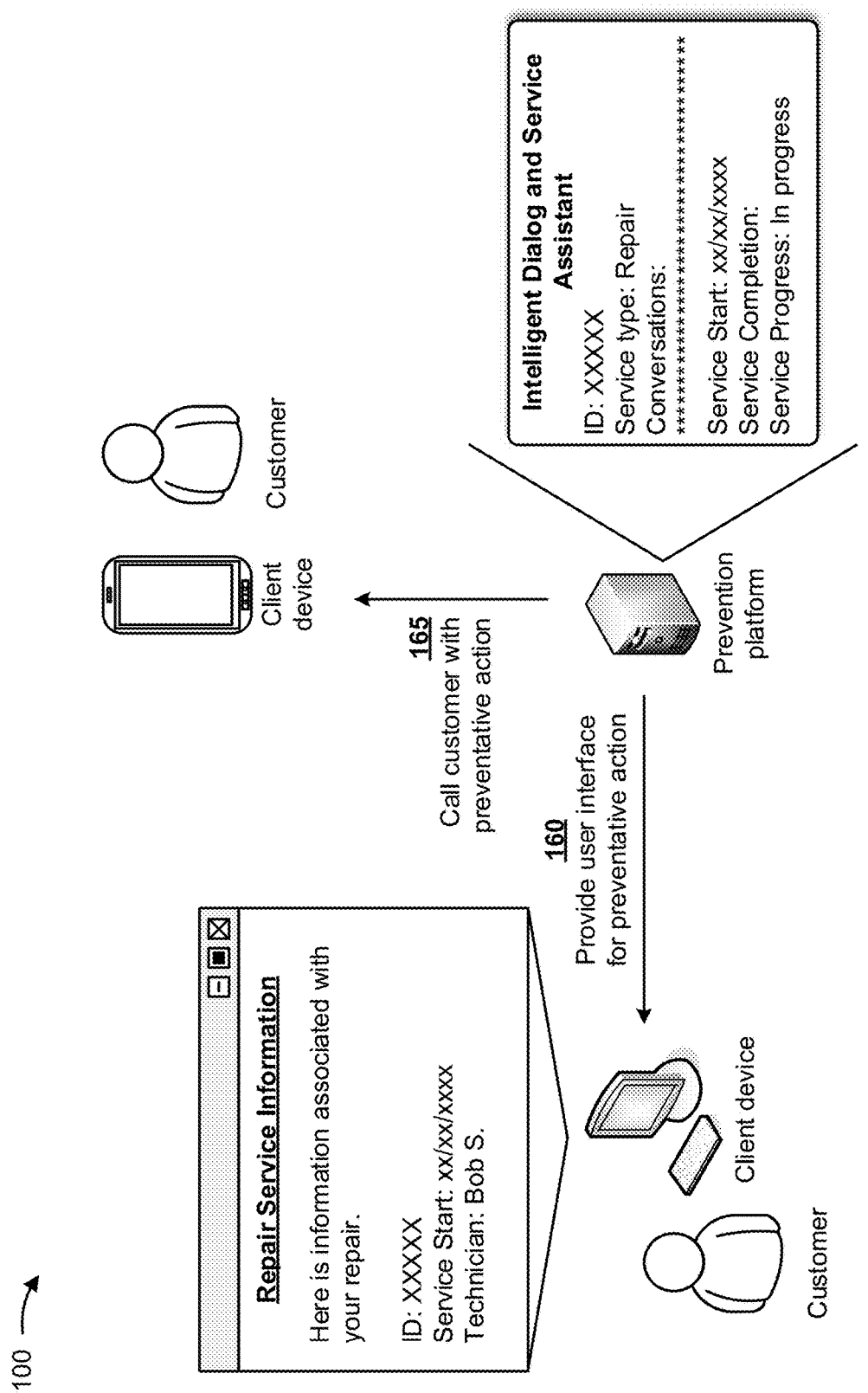

As shown in FIG. 1H, and by reference number 160, the prevention platform (e.g., via the intelligent dialog and service assistant) may provide solution to a client device associated with a customer (e.g., an applicant or a group of applicants), a user interface associated with the preventative solution. The client device may receive the user interface, and may provide the user interface for display to the customer. For example, the user interface may include information associated with a repair service to be provided for the customer (e.g., a service ID, a service start date, a technician name, and/or the like).

As further shown in FIG. 1H, and by reference number 165, the prevention platform (e.g., via the intelligent dialog and service assistant) may generate a call to another client device associated with another customer or applicant. When the other customer answers the call, the prevention platform (e.g., via the intelligent dialog and service assistant) may provide information to the other customer about the preventative solution (e.g., the repair service).

Figure 1I:
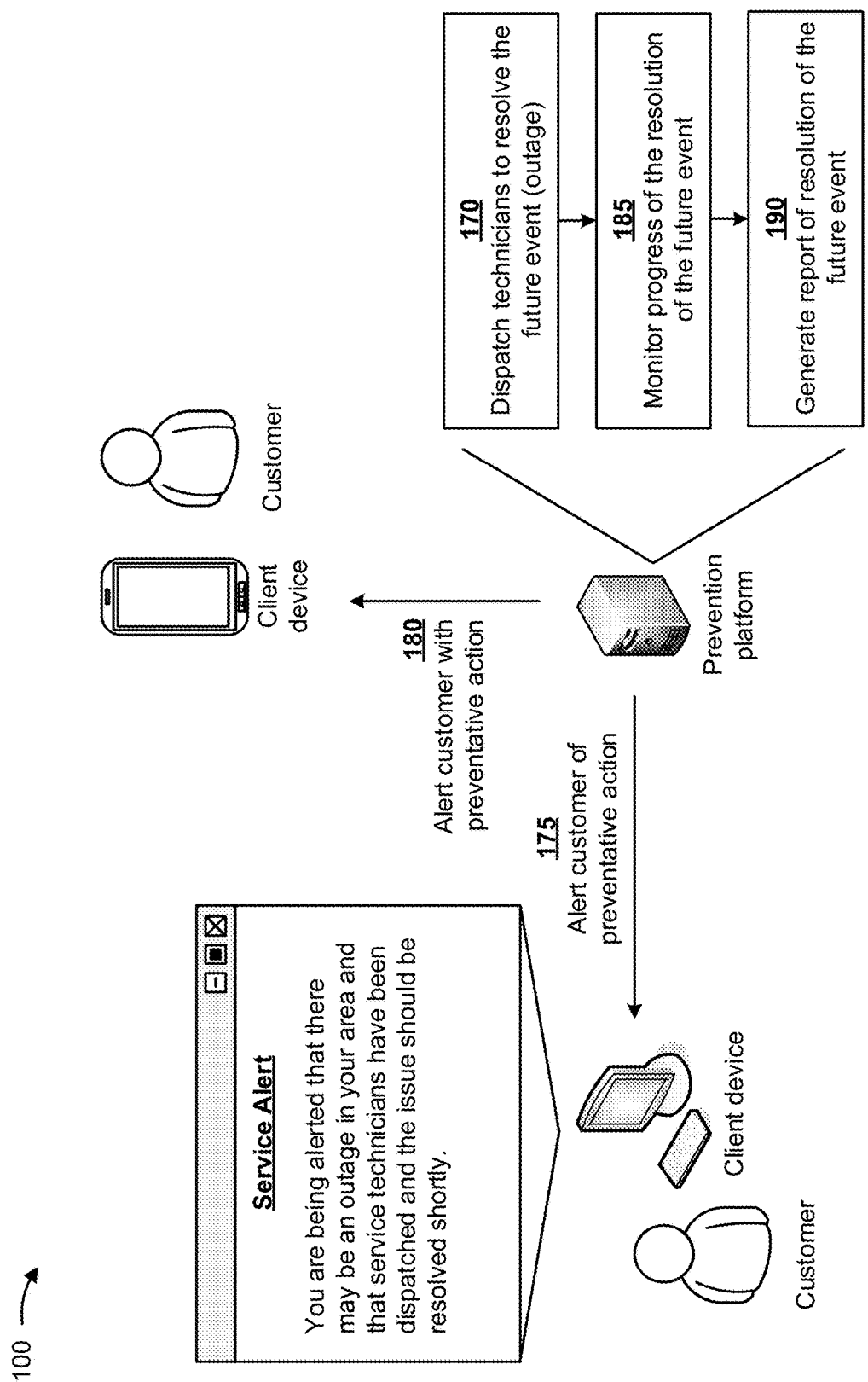

As shown in FIG. 1I, and by reference number 170, the prevention platform may cause a solution to be performed to address the future event (e.g., the outage), such as dispatching technicians to resolve the future event. As further shown in FIG. 1I, and by reference number 175, the prevention platform (e.g., via the intelligent dialog and service assistant) may provide, to the client device associated with the customer, an alert user interface associated with the preventative solution. The client device may receive the alert user interface, and may provide the alert user interface for display to the customer. For example, the alert user interface may include information indicating that the customer is being alerted that there may be an outage in the area, that service technicians have been dispatched, and that the issue should be resolved shortly.

In some implementations, the prevention platform may predict future events (e.g., an outage), may provide potential failure codes and/or preventive solutions, and may address the future events via dispatching technicians. For example, the prevention platform may determine that, within a time period, gas from a specific gas station may leak and cause danger because extreme cold weather creates cracks within gas pipelines, and may determine which qualified and well-trained technicians should be dispatched to resolve these issues.

As further shown in FIG. 1I, and by reference number 180, the prevention platform may (e.g., via the intelligent dialog and service assistant) generate a call to the other client device associated with the other customer. When the other customer answers the call, the prevention platform may provide the alert to the other customer about the outage in the area, the service technicians being dispatched, and the issue being resolved shortly.

As further shown in FIG. 1I, and by reference number 185, the prevention platform may monitor progress of the resolution of the future event solutions. For example, the prevention platform may monitor the progress of the technicians in resolving the outage, and may estimate a completion time for the resolution. The prevention platform may provide the estimated completion time to the client devices associated with clients and applicants.

As further shown in FIG. 1I, and by reference number 190, the prevention platform may generate a report of the resolution of the future event when the future event is resolved. For example, the prevention platform may generate a report indicating how much time was required to prevent the outage, customer response to the preventative solution, whether any customer complaints were received, and/or the like. In some implementations, the prevention platform may provide the report to personnel associated with the entity, such as a customer service department, managers, operators of the prevention platform, and/or the like. In some implementations, the prevention platform might require different levels of approvals when sharing information.

Moreover, massive scale information or large scale information may feed into the prevention platform. In some implementations, the prevention platform may handle thousands, millions, billions, and/or the like, of data records within a period of time (e.g., daily, weekly, monthly), and thus may provide big data capability. The big data handled by the prevention platform is so voluminous, dynamic, and complex that traditional data processing applications cannot be used and/or that the big data cannot be processed objectively by human.

In this way, the prevention platform may utilize artificial intelligence techniques and Internet of Things (IoT) to predict future events and to determine preventative solutions for the future events, which may improve speed and efficiency associated with providing customer service, and may conserve computing resources (e.g., processors, memory, and/or the like) associated with the entity (e.g., the client devices and/or the server devices). Furthermore, implementations described herein use a procedure via a device, which includes but not limited to computers, smart phones, and tablets, to perform tasks or roles that were not previously performed or were previously performed using subjective human intuition or input. For example, prior solutions merely utilize historical information to predict future customer service requests, do not reduce the quantity of customer service requests, and do not reduce the quantity of human agents. Finally, utilizing artificial intelligence to predict future events and to determine preventative solutions for the future events conserves computing resources (e.g., processors, memory, and/or the like) that would otherwise be wasted in unsuccessfully attempting to manage unnecessary customer service requests.

Furthermore, the prevention platform manages different types of client requests, communication channels of the requests, challenges in coordinating information from different types or communication channels, and/or the like. For example, the client requests may include inquiries, customer care, customer services, and/or the like, with respect to various issues in different industries (e.g., bill inquiries, damaged products, service outages, and/or the like); the communication channels may include telephone calls, email, regular mail, text messages, website interfaces, mobile applications, and/or the like; and the challenges in coordinating information from different types or communication channels may include human agents handling issues, which is costly and inefficient, customers sending requests via communication channels that are different than communication channels through which solutions are provided (e.g., a refund is mailed but customers did not receive the refunds and make phone calls), and/or the like. The prevention platform may handle real-time information, monitoring information, live streaming information, and/or the like, and may provide preventive diagnosis and elimination of customer service requests, which reduces a need for human agents.

Figure 1J:
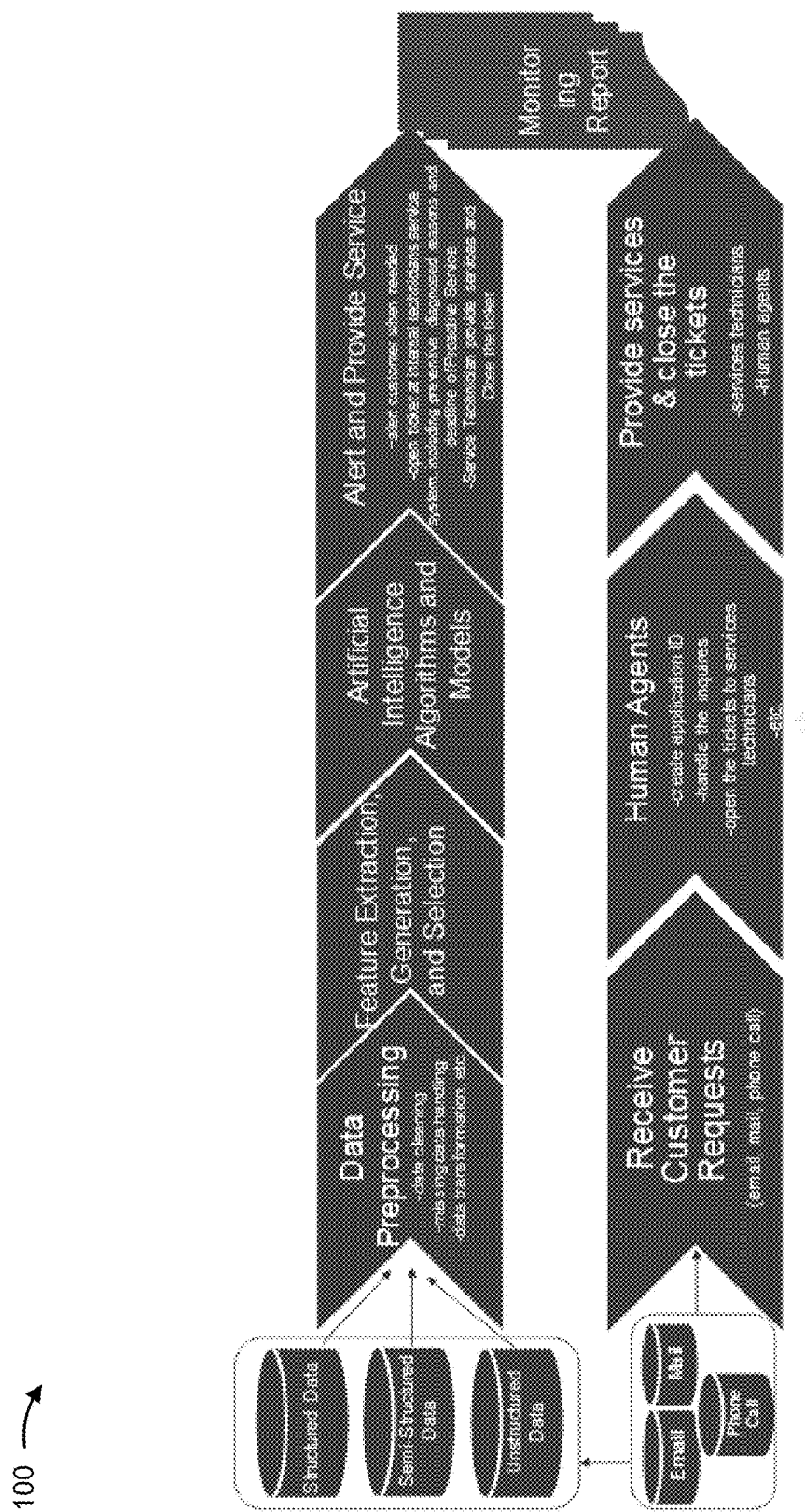

As shown in FIG. 1J, the prevention platform may receive structured data, semi-structured data, and unstructured data, and may perform data preprocessing on the received data, such as data cleansing, handling missing data, data transformation, and/or the like, as described elsewhere herein. The prevention platform may perform feature extraction, generation, and selection on the preprocessed data, as described elsewhere herein. The prevention platform may utilize artificial intelligence models and models with the features and the preprocessed data, as described elsewhere herein. The prevention platform may generate alerts (e.g., alert a customer when needed) and may provide a service (e.g., open a ticket at internal technician service system, including preventative diagnosed reasons and deadline of proactive service), as described elsewhere herein. The service technician may provide services and close a ticket. The prevention platform may provide monitoring reports, as described elsewhere herein.

As further shown in FIG. 1J, the prevention platform may receive customer requests (e.g., via email, mail, a phone call, and/or the like), as described elsewhere herein. Human agents may create an application ID, may handle inquiries, may open tickets for services and technicians, and/or the like, as described elsewhere herein. The prevention platform may provide services, and may close the tickets, as described elsewhere herein.

As indicated above, FIGS. 1A-1J are provided merely as examples. Other examples are possible and may differ from what was described with regards to FIGS. 1A-1J.

Figure 2:
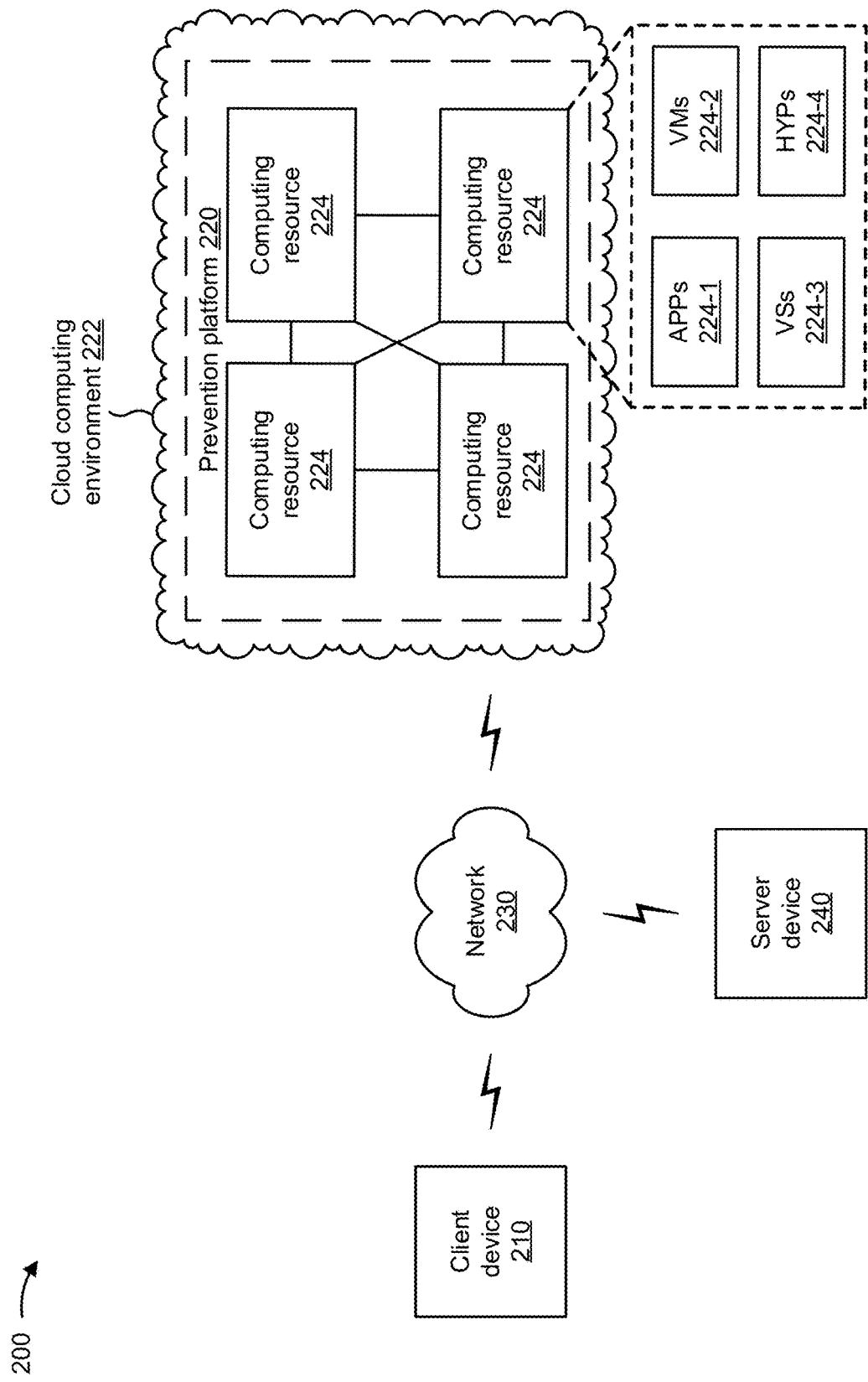
FIG. 2 is a diagram of an example environment in which systems and/or methods, described herein, may be implemented.

FIG. 2 is a diagram of an example environment 200 in which systems and/or methodologies, described herein, may be implemented. As shown in FIG. 2, environment 200 may include a client device 210, a prevention platform 220, a network 230, and a server device 240. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, client device 210 may receive information from and/or transmit information to prevention platform 220 and/or server device 240.

Prevention platform 220 includes one or more devices that utilizes artificial intelligence to predict future events and to determine preventative solution for the future events. In some implementations, prevention platform 220 may be designed to be modular such that certain software components may be swapped in or out depending on a particular need. As such, prevention platform 220 may be easily and/or quickly reconfigured for different uses. In some implementations, prevention platform 220 may receive information from and/or transmit information to one or more client devices 210 and/or server devices 240.

In some implementations, as shown, prevention platform 220 may be hosted in a cloud computing environment 222, a frog computational environment, an edge computational environment, and/or the like. Notably, while implementations described herein describe prevention platform 220 as being hosted in cloud computing environment 222, in some implementations, prevention platform 220 may not be cloud-based (i.e., may be implemented outside of a cloud computing environment) or may be partially cloud-based.

Cloud computing environment 222 includes an environment that hosts prevention platform 220. Cloud computing environment 222 may provide computation, software, data access, storage, etc. services that do not require end-user knowledge of a physical location and configuration of system(s) and/or device(s) that hosts prevention platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host prevention platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210. For example, application 224-1 may include software associated with prevention platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of client device 210 or server device 240, or an operator of prevention platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Server device 240 includes one or more devices capable of receiving, generating, storing, processing, and/or providing information, such as information described herein. For example, server device 240 may include a laptop computer, a tablet computer, a desktop computer, a server device, a group of server devices, or a similar type of device, which provides real-time customer data and historical customer data for access by client device 210 and/or prevention platform 220. In some implementations, server device 240 may receive information from and/or transmit information to client device 210 and/or prevention platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
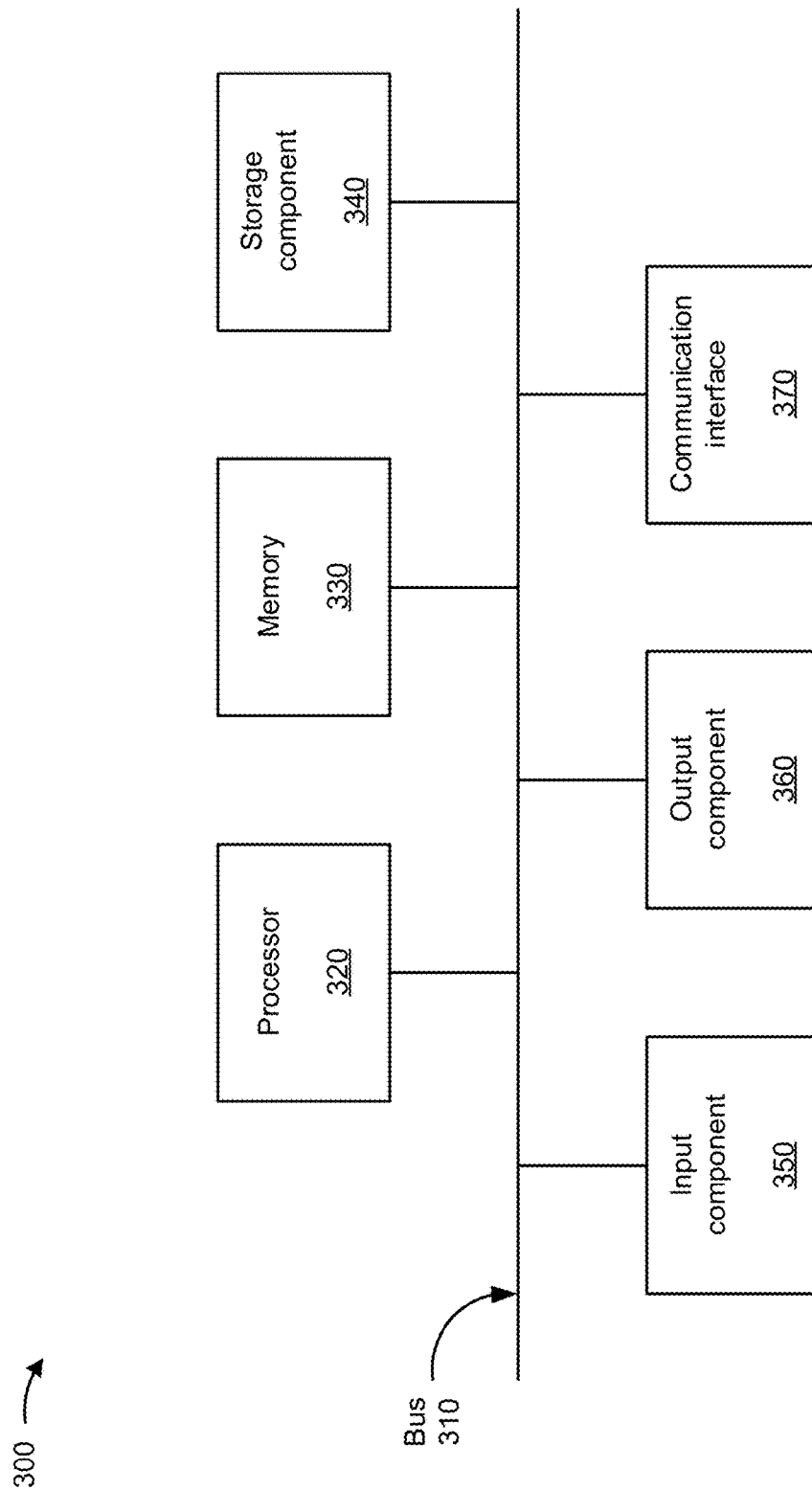
FIG. 3 is a diagram of example components of one or more devices of FIG. 2.

FIG. 3 is a diagram of example components of a device 300. Device 300 may correspond to client device 210, prevention platform 220, computing resource 224, and/or server device 240. In some implementations, client device 210, prevention platform 220, computing resource 224, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
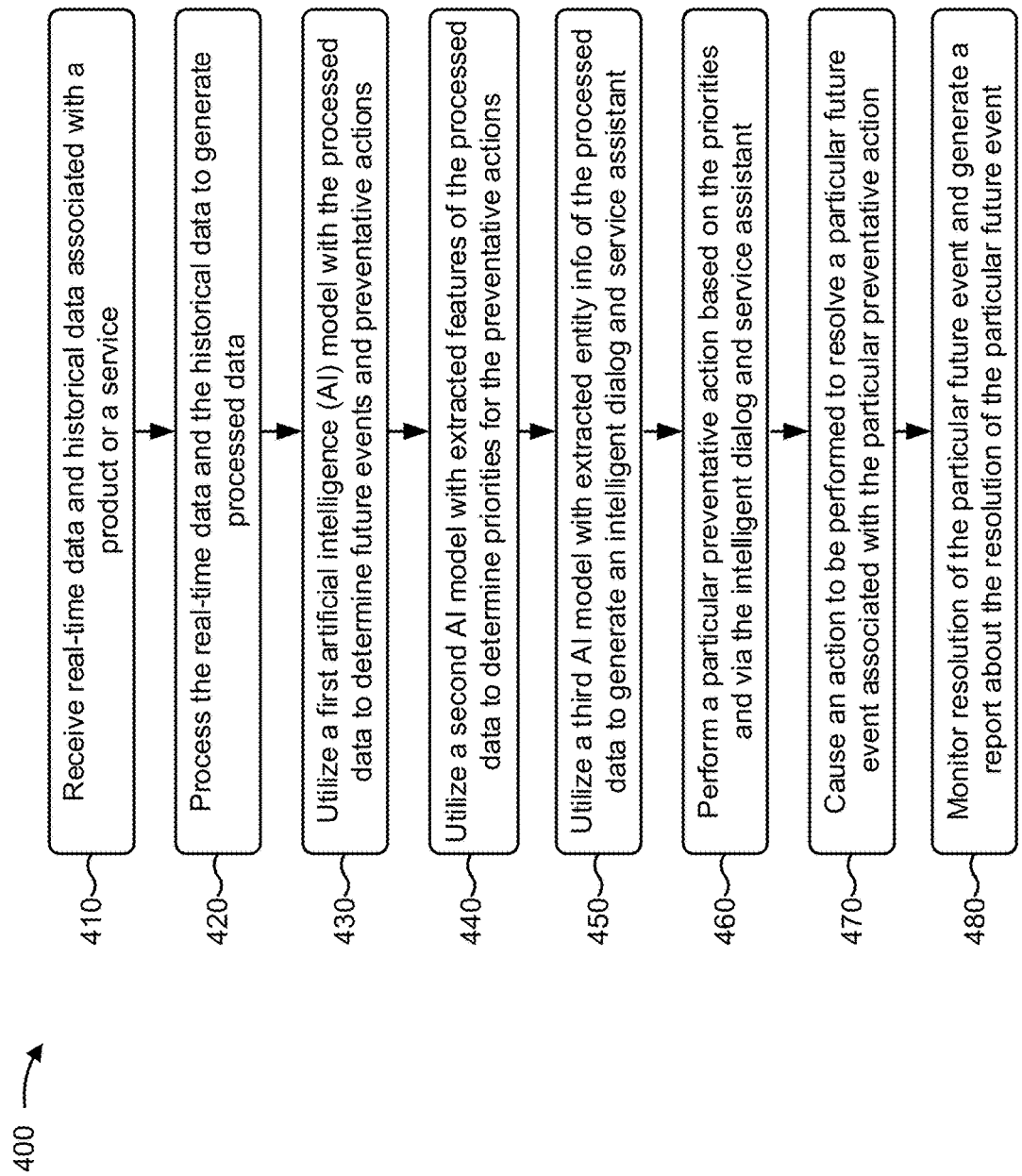
FIG. 4 is a flow chart of an example process for predicting future events and determining preventative solutions to future events using Internet of Things (IoT) and artificial intelligence techniques.

FIG. 4 is a flow chart of an example process 400 for utilizing artificial intelligence technologies and IoT to predict future events and to determine preventative solutions for the future events. In some implementations, one or more process blocks of FIG. 4 may be performed by prevention platform 220. In some implementations, one or more process blocks of FIG. 4 may be performed by another device or a group of devices separate from or including prevention platform 220, such as client device 210 and/or server device 240.

As shown in FIG. 4, process 400 may include receiving real-time data and historical data associated with a product or a service (block 410). For example, prevention platform 220 (e.g., using computing resource 224, processor 320, communication interface 370, and/or the like) may receive real-time information, remote IoT monitoring information, and historical information related to diagnosis, prevention, and solution determinations. In some implementations, an applicant service department could be associated with client devices 210, and may be associated with a service center for an entity which provides products and/or services to customers. The applicant service department personnel may utilize client devices 210 to interact with applicants via various communication channels (e.g., email, telephone, text messaging, an entity website, and/or the like). When applicant service personnel interact with applicants and clients in real-time, client devices 210 may generate real-time interaction information associated with interactions between the applicant service personnel and the applicants.

In some implementations, the real-time interaction information, the other real-time information, and the historical information may include information received from applicant devices (e.g., client devices 210), sensors connected to applicant devices, sensors monitoring equipment of the entity, sensors monitoring facilities of the entity, other sources of sensor information, and/or the like. For example, if prevention platform 220 is associated with an emergency call center, the information may include information received from vehicle/transportation sensors, client devices 210, sensors of client devices 210, and/or the like.

In some implementations, client devices 210 may provide, to server devices 240 (e.g., associated with the entity), the real-time interaction information and IoT monitoring information, and server devices 240 may receive and store the information. In some implementations, the real-time interaction information may include conversations associated with calls between an applicant service department and applicants, emails between the applicant service department and the applicants, service calls for the applicants, website sessions between the applicant service department and the applicants, and/or the like. In some implementations, client devices 210 may provide the real-time interaction information, the IoT monitoring information, and the related information to prevention platform 220 instead of server devices 240, or to prevention platform 220 and server devices 240.

In some implementations, server devices 240 may store other real-time information associated with the entity, such as service information (e.g., information related to services provided by the entity, information about current issues or events associated with the services, such as service outages or service prices increases, and/or the like), product information (e.g., information related to products provided by the entity, information about current events associated with the products, such as product recalls or product price increases, and/or the like), financial information (e.g., information associated with balance sheets, service prices, product prices, costs, and/or the like of the entity), repair information (e.g., information associated with repairs being provided by the entity to the customers or within the entity), and/or the like.

In some implementations, server devices 240 may store historical information associated with the entity, such as historical interaction information (e.g., historical information associated with calls, emails, service calls, website interactions, and/or the like), other historical information (e.g., historical service information, historical product information, historical financial information, historical repair information, historical information associated with equipment which provides products and/or services, and/or the like), and/or the like.

In some implementations, server devices 240 may provide real-time information (e.g., the real-time interaction information and the other real-time information), the IoT monitoring information, and historical information to prevention platform 220. Prevention platform 220 may receive the information, process the information, analyze the information, and store the information. In some implementations, prevention platform 220 securely store the information in storage (e.g., knowledge graph, traditional database, and NoSQL databases, etc.), secured platforms, or unstructured forms, and/or the like. In implementations, prevention platform 220 securely constructs storage of real time information, IoT information, and related historical data in a storage structure, such as a database, a table, a linked list, and/or the like, associated with prevention platform 220.

For example, the real-time information and the historical information may be securely stored using symmetric-key (or single-key) encryption technology. Using symmetric-key encryption technology, a single key, which is shared by prevention platform 220 and a user, may be used to encrypt and decrypt the real-time information and the historical information. Example symmetric-key technologies may include the advanced encryption standard (AES), the data encryption standard (DES), the triple DES, serpent, twofish, blowfish, the international data encryption algorithm (IDEA), and/or the like.

In some implementations, the real-time information and the historical information may be securely stored using an asymmetric-key (or public-key-private-key) encryption technology. Using the asymmetric-key encryption technology, the real-time information and the historical information may be encrypted with a private key, decrypted with a public key, to verify that the real-time data and the historical data was encrypted using the corresponding private key. Example asymmetric-key encryption technologies may include the digital signal model (DSA), the Rivest-Shamir-Adleman (RSA), the Diffie-Hellman key exchange, key serialization, asymmetric utilities, and/or the like.

In some implementations, the real-time information and the historical information may be securely stored by applying a cryptographic hash function to the real-time information and the historical information. The cryptographic hash function may be used to verify the integrity of files and/or messages, verify passwords, and/or the like. Example cryptographic hash functions may include the secure hash algorithm 1 (SHA-1), the secure hash algorithm 2 (SHA-2), the secure hash algorithm 3 (SHA-3), the message digest 5 (MD5), and/or the like.

In some implementations, prevention platform 220 may continuously receive the real-time information, IoT information, and other related information from client devices 210 and/or server devices 240. In some implementations, prevention platform 220 may periodically receive the real-time information from client devices 210 and/or server devices 240 (e.g., at particular time intervals and at the request of prevention platform 220). In some implementations, prevention platform 220 may receive the historical information separately from the real-time information. For example, prevention platform 220 may continuously receive the real-time information from client devices 210 and/or server devices 240, but may periodically receive the historical information from server devices 240.

In some implementations, the real-time information, IoT information, and the historical information may include structured information, semi-structured information, and unstructured information. Structured information may include information provided in data structures, such as databases, that are formatted for the data structures. Unstructured information may include information that is not formatted for data structures, such as video files, audio files, image files, and/or the like. Semi-structured information may include a combination of structured information and unstructured information.

In this way, prevention platform 220 may receive the real-time data and the historical data associated with the product or the service.

As further shown in FIG. 4, process 400 may include processing the real-time data and the historical data to generate processed data (block 420). For example, prevention platform 220 (e.g., using computing resource 224, processor 320, communication interface 370, and/or the like) may process the real-time information, the IoT information, and the historical information to generate processed information. In some implementations, prevention platform 220 may perform one or more processing techniques on the real-time information, the IoT information, and the historical information in order to convert the information into an electronic, or machine-encoded, information (e.g., processed information). Solution For example, prevention platform 220 may utilize optical character recognition, speech recognition, a natural language processing technique, a computational linguistics technique, a text analysis technique, a data normalization method, a data cleansing method, and/or the like, in order to process the real-time information, the IoT information, and the historical information and generate the processed information.

In some implementations, prevention platform 220 may utilize optical character recognition (OCR) with the real-time information, the IoT information, and the historical information in order to convert the information into electronic information. Optical character recognition involves a conversion of images of typed, handwritten, or printed text into machine-encoded text. For example, OCR may be applied to a scanned document, a photo of a document, a photo of a scene that includes text, and/or the like, to produce electronic data (e.g., text data). OCR can be used as a form of information entry from printed paper data records (e.g., printed forms, printed tables, printed reports, passport documents, invoices, bank statements, and/or the like). Converting printed text to electronic data allows the information represented by the printed text to be electronically edited, searched, stored more compactly, displayed online, and/or used in machine processes such as cognitive computing, machine translation, (extracted) text-to-speech, key data and text mining, and/or the like. Implementations of OCR may employ pattern recognition, artificial intelligence, computer vision, and/or the like.

In some implementations, prevention platform 220 may utilize speech recognition with the real-time information, the IoT information, and the historical information in order to convert audio-based information into text-based information. Speech recognition, which may also be known as automatic speech recognition (ASR), computer speech recognition, or speech to text (STT), involves recognizing (e.g., by a computer system) spoken language and translating the spoken language into text. For example, speech recognition may include converting audio data representing recorded language, words, or sentences, to text data representing the recorded language, words, or sentences.

In some implementations, prevention platform 220 may utilize a natural language processing technique, a computational linguistics technique, a text analysis technique, and/or the like, with the real-time information, the IoT information, and the historical information in order to make the real-time information, the IoT information, and the historical information analyzable (e.g., the processed information). For example, prevention platform 220 may apply natural language processing to interpret the real-time information, the IoT information, and the historical information and generate additional information associated with the potential meaning of information within the real-time information, the IoT information, and the historical information. Natural language processing involves techniques performed (e.g., by a computer system) to analyze, understand, and derive meaning from human language in a useful way. Rather than treating text like a mere sequence of symbols, natural language processing considers a hierarchical structure of language (e.g., several words can be treated as a phrase, several phrases can be treated as a sentence, and the words, phrases, and/or sentences convey ideas that can be interpreted). Natural language processing can be applied to analyze text, allowing machines to understand how humans speak, enabling real world applications such as automatic text summarization, sentiment analysis, topic extraction, named entity recognition, parts-of-speech tagging, relationship extraction, stemming, and/or the like.

In some implementations, prevention platform 220 may utilize a data normalization method to process the real-time information, the IoT information, and the historical information and to eliminate and/or reduce redundant data from the real-time information, the IoT information, and the historical information. The data normalization method may include identifying values or portions of data that are repeated unnecessarily in a file, data structure, and/or the like (e.g., in records or fields, within a table, and/or the like), eliminating such values or portions of data from the file, data structure, and/or the like, converting such values or portions of data from a differing and/or nonstandard format to a same and/or standard format, and/or the like. For example, the data normalization method may include database normalization, such as may be applied to a relational database to organize columns (attributes) and tables (relations) of a relational database to reduce data redundancy and improve data integrity. Database normalization may involve arranging attributes in relations based on dependencies between attributes, ensuring that the dependencies are properly enforced by database integrity constraints. Normalization may be accomplished by applying formal rules either by a process of synthesis (e.g., creating a normalized database design based on a known set of dependencies) or decomposition (e.g., improving an existing (insufficiently normalized) database design based on the known set of dependencies).

In some implementations, prevention platform 220 may utilize a data cleansing method to process the real-time information, the IoT information, and the historical information and to detect and/or correct corrupt or inaccurate data from the real-time information, the IoT information, and the historical information. The data cleansing method may include detecting and correcting (or removing) corrupt or inaccurate data (e.g., records from a record set, table, or database), and then replacing, modifying, or deleting the corrupt or inaccurate data. The data cleansing method may detect and correct inconsistencies originally caused by user entry errors, by corruption in transmission or storage, or by utilization of different definitions for similar data in different data stores. The data cleansing method may include removing typographical errors or validating and correcting values against a known list of entities. In this case, validation may be strict (e.g., rejecting any address that does not have a valid postal code) or fuzzy (e.g., correcting records that partially match existing, known records). The data cleansing method may also include cleaning data by cross checking the data with a validated data set, standardizing the data by changing a reference data set to a new standard (e.g., use of standard codes), and/or the like. Additionally, the data cleansing method may include data enhancement, where data is made more complete by adding related information (e.g., appending an address with any phone number related to that address). The data cleansing method may also involve activities, such as harmonization of data (e.g., harmonization of short codes (e.g., St., Rd., and/or the like) to actual words (e.g., street, road, and/or the like).

In this way, prevention platform 220 may process the real-time data and the historical data to generate the processed data.

As further shown in FIG. 4, process 400 may include utilizing a first artificial intelligence model with the processed data to determine future events and preventative solutions (block 430). For example, prevention platform 220 (e.g., using computing resource 224, processor 320, communication interface 370, and/or the like) may utilize a first artificial intelligence model with the processed data to determine future events and preventative solutions. In some implementations, prevention platform 220 may utilize the processed data with a trained artificial intelligence model. In some implementations, the artificial intelligence model may include one or more of a lasso regression model, a random forest model, a support vector machine model, an artificial neural network model, a data mining model, a frequent rule mining model, a pattern discovery model, and/or the like.

A lasso regression model may include a lasso (least absolute shrinkage and selection operator) method. The lasso method is a shrinkage and selection method for linear regression, and may include a regression analysis method that performs both variable selection and regularization in order to enhance the prediction accuracy and interpretability of the statistical model. The lasso method seeks to obtain a subset of predictors that minimizes prediction error for a quantitative response variable by imposing a constraint on the model parameters that causes regression coefficients for some variables to shrink toward zero. Variables with a regression coefficient equal to zero after the shrinkage process are excluded from the lasso method, while variables with non-zero regression coefficient variables are most strongly associated with the response variable. Although originally formulated for least squares models, the lasso method is extendable to a wide variety of statistical models, including generalized linear models, generalized estimating equations, proportional hazards models, M-estimators, and/or the like.

A random forest model may include an ensemble learning method for classification, regression, and other tasks. An ensemble learning method uses multiple learning models to gain better predictive results. In the case of a random forest, the ensemble learning model creates an entire forest of random uncorrelated decision trees to arrive at a best possible answer. The random forest model operates by constructing a multitude of decision trees at training time and outputting a class that is a mode of classes (classification) or a mean prediction (regression) of individual trees. The random forest model may correct for a decision tree overfitting to a training set (i.e., having a low bias, but a high variance) by providing a way of averaging multiple deep decision trees, trained on different parts of the same training set, with a goal of reducing a variance.

A support vector machine model may include a supervised learning model with one or more associated learning models that analyze data used for classification and regression analysis. Given a set of training examples, each training example being marked as belonging to one or the other of two categories, a training method of the supervised learning model builds a model that assigns new examples to one category or the other. The supervised learning model is a representation of examples as points in space, mapped so that the examples of separate categories are divided by a clear gap that is as wide as possible. New examples are then mapped into that same space and predicted to belong to a category based on which side of the gap they fall.

An artificial neural network model may include an artificial intelligence model that uses an artificial neural network (e.g., to determine one or more of the criteria). An artificial neural network utilizes a collection of connected units or nodes called artificial neurons. Each connection between artificial neurons can transmit a signal from one artificial neuron to another artificial neuron. The artificial neuron that receives the signal can process the signal and then provide a signal to artificial neurons to which it is connected. In common artificial neural network implementations, the signal at a connection between artificial neurons is a real number, and the output of each artificial neuron is calculated by a non-linear function. Artificial neurons and connections typically have a weight that adjusts as learning proceeds. The weight may increase or decrease the strength of the signal at a connection. Additionally, an artificial neuron may have a threshold such that the artificial neuron only sends a signal if the aggregate signal satisfies the threshold. Typically, artificial neurons are organized in layers, and different layers may perform different kinds of transformations on their inputs.

A data mining model may include a model that performs anomaly detection (e.g., outlier, change, and/or deviation detection) to identify unusual data records of interest or data errors that require further investigation, association rule learning (e.g., dependency modeling) to search for relationships between variables, clustering to discover groups and/or structures in data that are similar without using known structures in the data, classification to generalize known structure to apply to new data, regression to identify a function that models the data with the least error, summarization to provide a more compact representation of the data set, including visualization and report generation, and/or the like.

A frequent rule mining model may include a model that utilizes association rules, which are utilized to satisfy a user-specified minimum support and a user-specified minimum confidence. Association rule generation may be split up into two separate steps, applying a minimum support threshold to identify frequent item sets in data, and applying a minimum confidence constraint to the frequent item sets in order to form rules. Identifying frequent item sets in data involves searching possible item sets (e.g., item combinations). The set of possible item sets is power set over I and has size $2^n-1$. Although the size of the power set grows exponentially in the number of items n in I, efficient search is possible using a downward-closure property of support which guarantees that for a frequent item set, all its subsets are also frequent and thus no infrequent item set can be a subset of a frequent item set.

A pattern discovery model may include a data mining technique, such as sequential pattern mining. Sequential pattern mining is a type of structured data mining that seeks to identify statistically relevant patterns between data examples where the values are delivered in a sequence. Sequential pattern mining may be classified as string mining (e.g., which is based on string processing models), and/or item set mining (e.g., which is based on association rule learning). String mining deals with a limited alphabet for items that appear in a sequence, but where the sequence itself may be very long. Item set mining deals with discovering frequent item sets, and an order in which the frequent item sets appear.

In some implementations, prevention model 220 may utilize one or more of the trained artificial intelligence models, and may utilize the best results determined by one of the trained artificial intelligence models. In some implementations, prevention model 220 may utilize a plurality of the trained artificial intelligence models, and may aggregate the results determined by the plurality of trained artificial intelligence models.

In some implementations, utilizing the processed information with the trained artificial intelligence model may cause the trained artificial intelligence model to determine future events and preventative solutions to handle the future events. In some implementations, the future events may include a future event associated with a product (e.g., a recall of the product, a price increase for the product, and/or the like), a future event associated with a service (e.g., a service outage, an issuance of a bill for the service, maintaining equipment used to provide the service, and/or the like), a future event associated with particular customers (e.g., a price increase for a product or a service, a past due bill, and/or the like), and/or the like. In some implementations, the preventative solutions may include calling customers about servicing equipment to prevent a service outage, dispatching service technicians to service the equipment, texting customers about a potential service outage, emailing customers about past due bills, contacting customers via website or an application about a service outage, and/or the like.

In some implementations, prevention platform 220 may be associated with Internet of things (IoT) devices that monitor facilities, equipment, service centers, and/or the like, associated with the products and/or services of the entity. In such implementations, the IoT devices may collect real-time information simultaneously via remote sensing and/or IoT monitoring (e.g., real-time information associated with equipment that provides the products and/or the services, real-time information associated with facilities that provide the products and/or the services, and/or the like), and may provide the real-time information to prevention platform 220. Prevention platform 220 may include this real-time information with the processed information, and may utilize the real-time information to better predict the future events associated with the entity (e.g., equipment failures, environment issues, improper customer service, and/or the like).

In this way, prevention platform 220 may utilize the first artificial intelligence model with the processed data to determine the future events, associated with the product or the service, and preventative solutions for handling the future events.

As further shown in FIG. 4, process 400 may include utilizing a second artificial intelligence model with extracted features of the processed data to determine priorities for the preventative solutions (block 440). For example, prevention platform 220 (e.g., using computing resource 224, processor 320, communication interface 370, and/or the like) may utilize a second artificial intelligence model with extracted features of the processed information to determine priorities for the preventative solutions. In some implementations, prevention platform 220 may extract features from the processed information. In some implementations, the extracted features may include a feature indicating a likelihood of issues with a future event, a feature indicating diagnosed reasons associated with a future event, a feature indicating a value and risk (e.g., to an entity) associated with a future event, a feature indicating a customer retention risk associated with a future event, a feature indicating a customer value associated with a future event, a feature indicating customer loyalty associated with a future event, a feature indicating a service difficulty associated with a future event, and/or the like.

In some implementations, prevention platform 220 may utilize a variety of data extraction methodologies to extract the features from the processed information, such as extracting information into flat files using SQL, extracting data into flat files using a program, exporting data into export files, a full extraction method, an incremental extraction method, an online extraction method, an offline extraction method, an entity extraction method, a string matching method, and/or the like.

Extracting data into flat files using SQL may include executing a SQL query on data, and directing an output of the query to a flat file. Extracting data using a program may include utilizing the program to extract results of any SQL query, and directing an output to a flat file. Exporting data into export files may include exporting the data (e.g., including objects) into export files that include metadata as well as data.

The full extraction method may include completely extracting the features from the processed data. In the full extraction method, source data may be provided as-is and there may be no need to track the source data files for changes.

In the incremental extraction method, changes in the source data files may need to be tracked since a previous successful extraction, and only the changes in data files may be extracted. The incremental extraction method may detect the changes in the data files from specific columns in the source data files that have a last changed timestamp.

The online extraction method may include directly connecting to the data sources of the data, and directly extracting the data from the source data. The offline extraction method may include staging the data outside the source data sources, and extracting the data from the staged data into flat files, dump files, archive logs, tables, and/or the like.

The entity extraction method may identify and classify named entities in extracted data into pre-defined categories, such as names of persons, organizations, locations, expressions of time, quantities, monetary values, percentages, and/or the like.

The string matching method may identify where one or more strings (e.g., patterns) are located within extracted data. The string matching method may include a naïve string search method, a Rabin-Karp string search method, a Knuth-Morris-Pratt method, a Boyer-Moore string search method, a bitmap method, a two-way string-matching method, a backward non-deterministic dawg matching (BNDM) method, a backward Oracle matching (BOM) method, and/or the like.

In some implementations, prevention platform 220 may utilize the extracted features (e.g., the feature set) with a trained artificial intelligence model. In some implementations, the artificial intelligence model may include one or more of a lasso regression model, a random forest model, a support vector machine model, an artificial neural network model, a data mining model, a frequent rule mining model, a pattern discovery model, and/or the like. In some implementations, prevention platform 220 may train the artificial intelligence model as described elsewhere herein.

In some implementations, utilizing the feature sets, which include unsupervised learning, semi-supervised learning, and reinforcement learning, set with the trained artificial intelligence model may cause the trained artificial intelligence model to generate priorities or rankings for the preventative solutions stored in the preventative solution queue. In some implementations, prevention platform 220 may store information associated with the priorities with corresponding information associated with the preventative solutions in the preventative solution queue. In some implementations, the priorities may provide an indication of when the preventative solutions are to occur, with more urgent or important preventative solutions having higher priorities than less urgent or important preventative solutions.

In some implementations, prevention platform 220 (e.g., via the trained artificial intelligence model or a Question and Answer Dialog System and Proactive Prevention Platform) may assign different weights to the different features in the feature set, and may calculate priority scores for the preventative solutions based on the weighted features. In such implementations, prevention platform 220 may associate the priority scores with the preventative solutions in the preventative solution queue. A preventative solution with a highest priority score may be implemented first by prevention platform 220, a preventative solution with a next highest priority score may implemented second by prevention platform 220, and/or the like. In this way, prevention platform 220 may implement preventative solutions, which are more important to the entity, sooner rather than later.

In some implementations, prevention model 220 may utilize one or more of the trained artificial intelligence models, and may utilize the best results determined by one of the trained artificial intelligence models. In some implementations, prevention model 220 may utilize a plurality of the trained artificial intelligence models, and may aggregate the results determined by the plurality of trained artificial intelligence models.

In this way, prevention platform 220 may utilize the second artificial intelligence model with the extracted features of the processed data to determine the priorities for the preventative solutions.

As further shown in FIG. 4, process 400 may include utilizing a third artificial intelligence model with extracted entity information of the processed data to generate an intelligent dialog and service assistant (block 450). For example, prevention platform 220 (e.g., using computing resource 224, processor 320, communication interface 370, and/or the like) may utilize a third artificial intelligence model with extracted entity information of the processed data to generate an intelligent dialog and service assistant. In some implementations, prevention platform 220 may extract entity information from the processed data. In some implementations, prevention platform 220 may utilize a variety of data extraction methodologies to extract the entity information from the processed information, such as extracting data into flat files using SQL, extracting data into flat files using a program, exporting data into export files, a full extraction method, an incremental extraction method, an online extraction method, an offline extraction method, an entity extraction method, a string matching method, shallow parsing, deep parsing, dependency parsing, conditional random fields, Latent Dirichlet Allocation, Topic Model clustering, other unsupervised learning techniques, and/or the like, as described elsewhere herein.

In some implementations, the entity information may include information identifying entities, entity categories, entity relationships, and/or the like. The entities may include customers, the entity offering the product or the service, payment methodologies by customers, applicant service department, and/or the like. The entity categories may include names of customers, a name of the entity, names of customer service personnel, a billing company name, and/or the like. The entity relationships may include "is served by" relationship information (e.g., a customer is served by a customer service person), "is a category of" relationship information (e.g., a customer name is a category of a customer), "is a subcategory of" relationship information (e.g., a billing company name is a subcategory of a payment method), and/or the like.

In some implementations, prevention platform 220 may utilize the entity information with a trained artificial intelligence model. In some implementations, the artificial intelligence model may include one or more of a lasso regression model, a random forest model, a support vector machine model, an artificial neural network model, a data mining model, a frequent rule mining model, a pattern discovery model, and/or the like, as described elsewhere herein. In some implementations, prevention platform 220 may train the artificial intelligence model as described elsewhere herein.

In some implementations, prevention model 220 may utilize one or more of the trained artificial intelligence models, and may utilize the best results determined by one of the trained artificial intelligence models. In some implementations, prevention model 220 may utilize a plurality of the trained artificial intelligence models, and may aggregate the results determined by the plurality of trained artificial intelligence models.

In some implementations, prevention platform 220 includes proactive diagnosis and operational requests elimination functions based upon internet of things technologies to monitor entities/objects (such as facilities, equipment, and operational centers, etc.), and to produce preventive diagnosis, elimination of operational requests, and provide service ahead of time. IoT devices gather live information simultaneously via remote sensing and/or IoT monitoring. Information flows, interacts, and processes via techniques which include IoT, AI, and machine learning instantaneously, where agents gather information on sites or gathered remotely using sensors. These proactive diagnosis and operational requests elimination modules identify potential requests in terms of damages or out of services, and alarm internally to provide services to applicants ahead of requests.

In some implementations, utilizing the entity information with the trained artificial intelligence model may cause the trained artificial intelligence model to generate an intelligent dialog and service assistant. In some implementations, the intelligent dialog and service assistant may include a virtual assistant (e.g., a virtual concierge) that is assigned to a particular customer for a particular preventative solution or until the customer is no longer a customer. In some implementations, the intelligent dialog and service assistant may continuously evaluate potential needs of the particular customer, and may proactively initiate services for the particular customer (e.g., proactively schedule a repair, proactively contact the particular customer, and/or the like) prior to the particular customer initiates with the entity. In some implementations, the intelligent dialog and service assistant may provide intelligent question and answer dialog with the particular customer, and may provide proactive assistance to the particular customer.

In some implementations, the intelligent dialog and service assistant may include a chat bot (e.g., a computer program that conducts conversations via auditory or textual methodologies) when interacting with the particular customer. In such implementations, the chat bot may provide mechanisms for customer input to and interaction with prevention platform 220. For example, the chat bot may guide the process for providing a repair service for the particular customer. In some implementations, the chat bot may include an Artificial Intelligence Virtual Assistant (AIVA) chat bot, a JavaScript (JS) chat bot, a node JS (or Node.js, an open source JavaScript run-time environment) chat bot, a Hubot chat bot, and/or the like.

In this way, prevention platform 220 may utilize the third artificial intelligence model with the extracted entity information of the processed data to generate the intelligent dialog and service assistant.

As further shown in FIG. 4 includes indexing preventative solutions with priorities scores computations, process 400 may include performing a particular preventative solution based on the priorities via the intelligent dialog and service assistant (block 460). For example, prevention platform 220 (e.g., using computing resource 224, processor 320, communication interface 370, and/or the like) may perform a particular preventative solution based on the priorities and via the intelligent dialog and service assistant. In some implementations, prevention platform 220 (e.g., via the intelligent dialog and service assistant) may provide, to client device 210 associated with a customer, a user interface associated with the preventative solution. Client device 210 may receive the user interface, and may provide the user interface for display to the customer. In some implementations, prevention platform 220 (e.g., via the intelligent dialog and service assistant) may generate a call to another client device 210 associated with another customer. When the other customer answers the call, prevention platform 220

(e.g., via the intelligent dialog and service assistant) may provide information to the other customer about the preventative solution. In some implementations, the priorities may indicate that the customer is be contacted before the other customer, that the customer and the other customer are to be contacted simultaneously, and/or the like.

In this way, prevention platform 220 may perform the particular preventative solution based on the priorities and via the intelligent dialog and service assistant.

As further shown in FIG. 4, process 400 may include causing a solution to be performed to resolve a particular future event associated with the particular preventative solution (block 470). For example, prevention platform 220 (e.g., using computing resource 224, processor 320, communication interface 370, and/or the like) may cause a solution to be performed to resolve a particular future event associated with the particular preventative solution. In some implementations, prevention platform 220 may cause a solution to be performed to address the future event (e.g., the outage), such as dispatching technicians to resolve the future event.

In some implementations, prevention platform 220 (e.g., via the intelligent dialog and service assistant) may provide, to client device 210 associated with the customer, an alert user interface associated with the preventative solution. Client device 210 may receive the alert user interface, and may provide the alert user interface for display to the customer. In some implementations, prevention platform 220 may (e.g., via the intelligent dialog and service assistant) generate a call to the other client device 210 associated with the other customer. When the other customer answers the call, prevention platform 220 may provide the alert to the other customer.

In some implementations, prevention platform 220 may cause other solutions to be performed to resolve the particular future event associated with the particular preventative solution, such as performing maintenance on equipment, replacing equipment that is about to fail, replacing a product that is about to fail, issuing rebates for a product that is about to fail, and/or the like. In some implementations, the other solutions may include causing software to be downloaded and installed onto a device (e.g., failing equipment), causing the device to reboot, causing the device to shut down and causing a backup device to start up, automatically purchasing equipment and causing the equipment to be shipped to the customer, causing an unmanned aerial vehicle (UAV) or drone to deliver equipment to the customer, causing an autonomous vehicle to drive a technician to a location of the customer, causing a work schedule to be updated, and/or the like.

In some implementations, prevention platform 220 may cause the solution to be performed to resolve the particular future event associated with the particular preventative solution.

As further shown in FIG. 4, process 400 may include monitoring a resolution of the particular future event and generating a report about the resolution of the particular future event (block 480). For example, prevention platform 220 (e.g., using computing resource 224, processor 320, communication interface 370, and/or the like) may monitor a resolution of the particular future event, and may generate a report about the resolution of the particular future event. In some implementations, prevention platform 220 may monitor progress of the resolution of the future event. For example, prevention platform 220 may monitor progress of technicians in resolving an outage, may monitor progress of maintenance of equipment, may monitor progress of replacing equipment, and/or the like.

In some implementations, prevention platform 220 may generate a report of the resolution of the future event when the future event is resolved. In some implementations, the report may indicate how much time was required to prevent an outage, perform maintenance on equipment, replace equipment, and/or the like; customer response to the preventative solution; whether any customer complaints were received; costs incurred to resolve the future event; and/or the like. In some implementations, prevention platform 220 may provide the report to personnel associated with the entity, such as customer service personnel, managers, operators of prevention platform 220, and/or the like.

In this way, prevention platform 220 may monitor the resolution of the particular future event, and may generate the report about the resolution of the particular future event.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein may provide a prevention platform that utilizes artificial intelligence to predict future events and to determine preventative solutions for the future events. For example, the prevention platform may receive real-time data and historical data associated with a product or a service, and may process the real-time data and the historical data to generate processed data. The prevention platform may utilize a first artificial intelligence model with the processed data to determine future events and preventative solutions for the future events, and may utilize a second artificial intelligence model with extracted features of the processed data to determine priorities for the preventative solutions. The prevention platform may utilize a third artificial intelligence model with extracted entity information of the processed data to generate an intelligent dialog and service assistant, and may perform a particular preventative solution based on the priorities and via the intelligent dialog and service assistant. The prevention platform may cause a solution to be performed to resolve a particular future event associated with the particular preventative solution, may monitor resolution of the particular future event, and may generate a report about the resolution.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methodologies, described herein, may be implemented in different forms of hardware, firmware, or a combination of hardware and software. The actual specialized control hardware or software code used to implement these systems and/or methodologies is not limiting of the implementations. Thus, the operation and behavior of the systems and/or methodologies were described herein without reference to specific software code—it being understood that software and hardware may be designed to implement the systems and/or methodologies based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive real-time data and historical data associated with a product or a service,
the real-time data including data indicating real-time interactions between customers of the product or the service and customer service personnel;
process the real-time data and the historical data to generate processed data;
utilize a first artificial intelligence model with the processed data to determine:
future events associated with the product or the service, and
preventative solutions for the future events;
extract one or more features from the processed data to provide extracted features;
utilize a second artificial intelligence model with the extracted features to determine priorities associated with the preventative solutions;
store information associated with the preventative solutions in a preventative solution queue as an IF-THEN rules-based system based on the priorities associated with the preventative solutions; and
perform one or more particular preventative solutions, of the preventative solutions, based on the preventative solution queue and the priorities associated with the preventative solutions.

2. The device of claim 1, wherein the one or more processors are further to:
cause the one or more particular preventative solutions to be performed to resolve a particular future event associated with the one or more particular preventative solutions or resolve a series of future events simultaneously with the one or more particular preventative solutions; and
monitor one or more resolutions of the particular future event based on the one or more particular preventative solutions.

3. The device of claim 2, wherein the one or more processors are further to:
generate one or more reports about the one or more resolutions of the particular future event; and
provide the one or more reports to at least the customer service personnel.

4. The device of claim 1, wherein the one or more processors are further to:
extract entity information from the processed data; and
utilize a third artificial intelligence model with the entity information to generate a virtual assistant;
wherein the one or more processors, to perform the one or more particular preventative solutions, are to:
perform the one or more particular preventative solutions via the virtual assistant.

5. The device of claim 1, wherein the one or more processors, to perform the one or more particular preventative solutions, are to:
perform the one or more particular preventative solutions via one or more communication channels,
the one or more communication channels including one or more of:
an email message,
a telephone call,
a text message,
a website interface, or
a mobile application.

6. The device of claim 1, wherein the one or more processors are further to:
create one or more notices of one or more predicted future events associated with the one or more particular preventative solutions; and
provide the one or more notices to one or more client devices.

7. The device of claim 1, wherein the one or more processors, to process the real-time data and the historical data to generate the processed data, are to:
utilize one or more of:
optical character recognition with the real-time data and the historical data,
speech recognition with the real-time data and the historical data,
a natural language processing technique with the real-time data and the historical data,
a computational linguistics technique with the real-time data and the historical data,
a text analysis technique with the real-time data and the historical data,
a data normalization method with the real-time data and the historical data, or
a data cleansing method with the real-time data and the historical data.

8. A method, comprising:
receiving, by a device, real-time data and historical data associated with a product or a service,
the real-time data including data indicating real-time interactions between customers of the product or the service and customer service personnel;
processing, by the device, the real-time data and the historical data to generate processed data;
utilizing, by the device, a first artificial intelligence model with the processed data to determine:
future events associated with the product or the service, and
preventative solutions for the future events;
extracting, by the device, one or more features from the processed data to provide extracted features;
utilizing, by the device, a second artificial intelligence model with the extracted features to determine priorities associated with the preventative solutions;
extracting, by the device, entity information from the processed data;
generating, by the device, a virtual assistant based on the entity information;
storing, by the device, information associated with the preventative solutions in a preventative solution queue as an IF-THEN rules-based system based on the priorities associated with the preventative solutions; and
performing, by the device, one or more particular preventative solutions, of the preventative solutions, based on the preventative solution queue and the priorities associated with the preventative solutions and via the virtual assistant.

9. The method of claim 8, wherein each of the first artificial intelligence model or the second artificial intelligence model includes one or more of:
a lasso regression model,
a random forest model,
a support vector machine model,
an artificial neural network model,
a data mining model,
a frequent rule mining model, or
a pattern discovery model.

10. The method of claim 8, wherein utilizing the second artificial intelligence model with the extracted features to determine the priorities comprises:
assigning different weights to the extracted features to provide weighted features; and
calculating priority scores for the preventative solutions based on the weighted features,
the priority scores corresponding to the priorities associated with the preventative solutions.

11. The method of claim 8, further comprising:
causing one or more solutions to be performed to resolve a particular future event associated with the one or more particular preventative solutions or to resolve a series of future events simultaneously associated with the one or more particular preventative solutions; and
monitoring one or more resolutions of the particular future event or the series of future events based on the one or more solutions.

12. The method of claim 11, further comprising:
generating one or more reports about the one or more resolutions of the particular future event; and
providing the one or more reports to at least the customer service personnel.

13. The method of claim 8, further comprising:
generating an alert about a particular future event associated with the one or more particular preventative solutions; and
providing the alert to one or more client devices.

14. The method of claim 8, wherein performing the one or more particular preventative solutions comprises:
performing the one or more particular preventative solutions via communications with one or more client devices.

15. A non-transitory computer-readable medium storing instructions, the instructions comprising:
one or more instructions that, when executed by one or more processors of a device, cause the one or more processors to:
receive real-time data and historical data associated with a product or a service,
the real-time data including data indicating real-time interactions between customers of the product or the service and customer service personnel, and
the historical data including data indicating historical interactions between the customers and the customer service personnel;
utilize a first artificial intelligence model with the real-time data and the historical data to determine:
future events associated with the product or the service, and
preventative solutions for the future events;
extract one or more features from the real-time data and the historical data to provide extracted features;
utilize a second artificial intelligence model with the extracted features to determine priorities associated with the preventative solutions;
extract entity information from the real-time data and the historical data;
utilize a third artificial intelligence model with the entity information to generate a virtual assistant;
store information associated with the preventative solutions in a preventative solution queue as an IF-THEN rules-based system based on the priorities associated with the preventative solutions; and
perform one or more particular preventative solutions, of the preventative solutions, based on the preventative solution queue and the priorities associated with the preventative solutions and via the virtual assistant.

16. The non-transitory computer-readable medium of claim 15, wherein the instructions further comprise:
one or more instructions that, when executed by the one or more processors, cause the one or more processors to:
cause a solution to be performed to resolve a particular future event associated with the one or more particular preventative solutions; and
monitor a resolution of the particular future event based on the solution.

17. The non-transitory computer-readable medium of claim 16, wherein the instructions further comprise:
one or more instructions that, when executed by the one or more processors, cause the one or more processors to:
generate a report about the resolution of the particular future event.

18. The non-transitory computer-readable medium of claim 15, wherein the instructions further comprise:
one or more instructions that, when executed by the one or more processors, cause the one or more processors to:

generate an alert about a particular future event associated with the one or more particular preventative solutions; and provide the alert to one or more client devices.

19. The non-transitory computer-readable medium of claim 15, wherein the one or more instructions, that cause the one or more processors to utilize the second artificial intelligence model with the extracted features to determine the priorities, cause the one or more processors to:

assign different weights to the extracted features to provide weighted features; and calculate and index priority scores for the one or more particular preventative solutions based on the weighted features, wherein the priority scores correspond to the priorities associated with the one or more particular preventative solutions.

20. The non-transitory computer-readable medium of claim 15, wherein the real-time data includes:

real-time data associated with equipment that provides the product or the service, or real-time data provided by Internet of things (IoT) devices.

\* \* \* \* \*